(12) United States Patent
Yeh

(10) Patent No.: US 12,579,275 B1
(45) Date of Patent: Mar. 17, 2026

(54) ORCHESTRATED EXECUTION OF CODE BY A CLOUD-BASED DATA INTAKE AND QUERY SYSTEM

(71) Applicant: Cisco Technology, Inc., San Jose, CA (US)

(72) Inventor: Anne Yeh, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 130 days.

(21) Appl. No.: 17/714,844

(22) Filed: Apr. 6, 2022

(51) Int. Cl.
*G06F 21/57* (2013.01)
*G06F 9/50* (2006.01)
*G06F 21/62* (2013.01)

(52) U.S. Cl.
CPC .......... *G06F 21/577* (2013.01); *G06F 9/5072* (2013.01); *G06F 9/5077* (2013.01); *G06F 21/6218* (2013.01)

(58) Field of Classification Search
CPC ........................... G06F 21/577; G06F 21/6218
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |

| | | | |
|---|---|---|---|
| 9,323,556 B2 * | 4/2016 | Wagner ................... | G06F 9/547 |
| 10,127,258 B2 | 11/2018 | Lamas et al. | |
| 10,860,618 B2 * | 12/2020 | Cruise ................. | G06F 11/3452 |
| 10,936,585 B1 * | 3/2021 | Echeverria ............... | G06N 5/00 |
| 2017/0063912 A1 * | 3/2017 | Muddu ............... | G06V 10/225 |
| 2017/0171231 A1 * | 6/2017 | Reybok, Jr. ......... | H04L 63/1433 |
| 2018/0077035 A1 * | 3/2018 | Vlachogiannis ...... | H04L 43/062 |

(Continued)

OTHER PUBLICATIONS

Malawski, Maciej, et al. "Serverless execution of scientific workflows: Experiments with hyperflow, aws lambda and google cloud functions." Future Generation Computer Systems 110 (2020): 502-514. (Year: 2020).*

(Continued)

*Primary Examiner* — John M Macilwinen
(74) *Attorney, Agent, or Firm* — Kilpatrick Townsend & Stockton LLP

(57) ABSTRACT

Techniques are described for enabling a cloud-based data intake and query system, and applications designed to interface with a data intake and query system, to use a combination of a message queuing service, an on-demand code execution service, and optionally other services and computing resources provided by a cloud provider network to orchestrate execution of a security intelligence management service in a scalable fashion. The code used to access and process data from individual external services is implemented as independently deployable packages that can be executed by an on-demand code execution service. The execution of such functions can be triggered using a message queueing service, such that the orchestration of functions used to access any number of external services can be managed by a security intelligence management service without the need to provision dedicated computing resources for the entire service.

17 Claims, 8 Drawing Sheets

(56)                    References Cited

U.S. PATENT DOCUMENTS

| | | | |
|---|---|---|---|
| 2019/0098106 A1 | 3/2019 | Mungel et al. | |
| 2021/0064436 A1* | 3/2021 | Calmon | G06F 9/5016 |
| 2021/0117251 A1* | 4/2021 | Cristofi | G06F 9/542 |
| 2021/0192057 A1* | 6/2021 | Helfman | G06F 21/577 |
| 2023/0153425 A1* | 5/2023 | Yuceer | H04L 63/1425 |
| | | | 726/23 |

OTHER PUBLICATIONS

Sheikh, Simeen, Ganesan Suganya, and M. Premalatha. "Automated resource management on AWS cloud platform." Proceedings of 6th International Conference on Big Data and Cloud Computing Challenges: ICBCC 2019, UMKC, Kansas City, USA. Springer Singapore. (Year: 2020).*
Splunk Cloud 8.0.2004 User Manual (line numbering added). (Year: 2020).*

Salah, Khaled, and Tarek Rahil Sheltami. "Performance modeling of cloud apps using message queueing as a service (MaaS)." 2017 20th Conference on Innovations in Clouds, Internet and Networks (ICIN). IEEE. (Year: 2017).*
Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carasso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

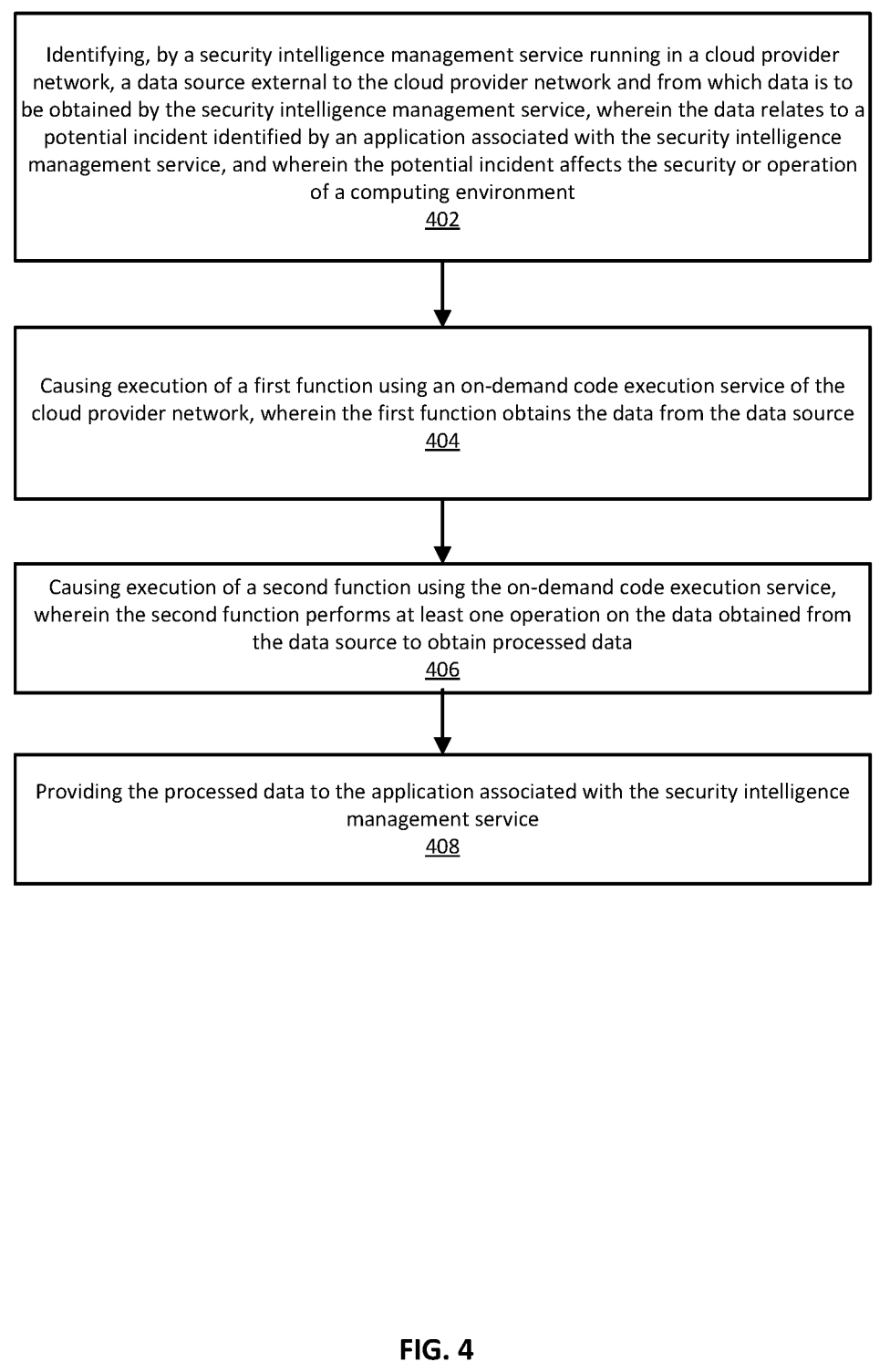

Identifying, by a security intelligence management service running in a cloud provider network, a data source external to the cloud provider network and from which data is to be obtained by the security intelligence management service, wherein the data relates to a potential incident identified by an application associated with the security intelligence management service, and wherein the potential incident affects the security or operation of a computing environment
402

Causing execution of a first function using an on-demand code execution service of the cloud provider network, wherein the first function obtains the data from the data source
404

Causing execution of a second function using the on-demand code execution service, wherein the second function performs at least one operation on the data obtained from the data source to obtain processed data
406

Providing the processed data to the application associated with the security intelligence management service
408

FIG. 4

ORCHESTRATED EXECUTION OF CODE BY A CLOUD-BASED DATA INTAKE AND QUERY SYSTEM

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

The ability to monitor the operation and security of even a moderately complex computing environment typically involves a large number of tasks including, for example, investigating alerts generated by various operational and security monitoring applications, performing tasks to detect, triage, and respond to identified threats, and the like. To aid users with these and other tasks, information technology (IT) and security operations applications (sometimes referred to as Security Orchestration, Automation, and Response (SOAR) applications) provide capabilities to automate many repetitive tasks, to triage security incidents faster with automated detection, investigation, and response, and to strengthen defenses by connecting and coordinating complex workflows across security analyst teams and tools.

BRIEF DESCRIPTION OF THE DRAWINGS

Illustrative examples are described in detail below with reference to the following figures:

FIG. 4 is a flow diagram illustrating operations of a method for orchestrating the execution of code used by a security intelligence management service to obtain data from external data sources according to some examples.

DETAILED DESCRIPTION

Figure 1:
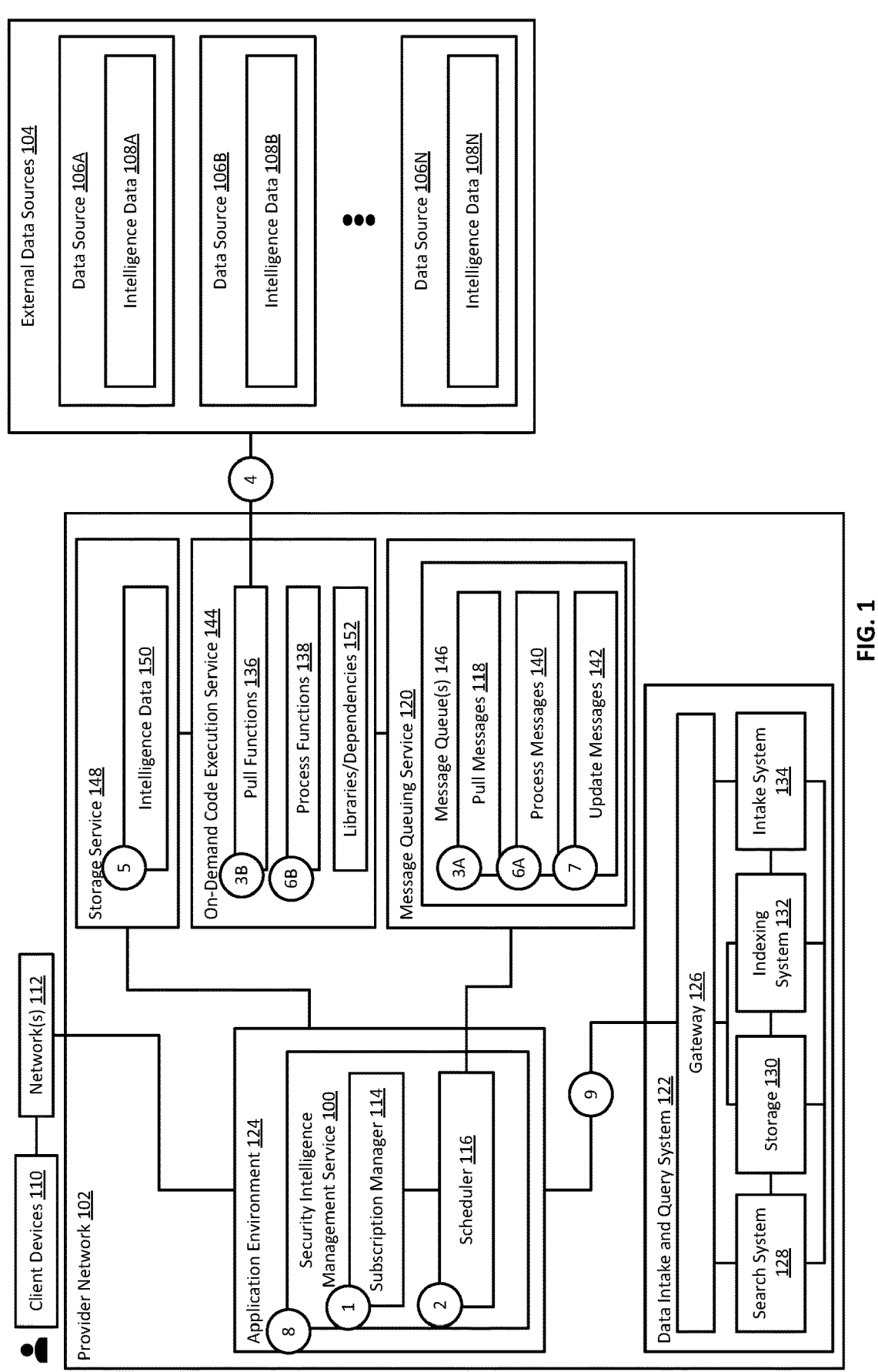
FIG. 1 is a block diagram of an example computing environment including a security intelligence management service that is configured to orchestrate the execution of code used to obtain intelligence data from external data sources according to some examples.

The present disclosure relates to methods, apparatus, systems, and non-transitory computer-readable storage media for enabling a data intake and query system, or applications designed to interface with a data intake and query system, to automate the execution of program code used to perform various types of functionality in a secure and scalable fashion. According to examples described herein, applications associated with a data intake and query system running in a cloud provider network use a combination of a message queuing service, an on-demand code execution service, and possibly other computing services and computing resources to orchestrate the execution of code implementing functionality related to obtaining data from external data sources, executing actions as part of an automated playbook workflow, and the like.

As one example, consider a security intelligence management service running within an application environment provided by a data intake and query system. A security intelligence management service enables the automated ingestion and processing of security intelligence data from third party data sources, as well as from other internal, historical intelligence sources. The data obtained from such data sources can be used, for example, to enrich incident information obtained and managed by other security services and applications. As one example, an IT and security operations application might generate an incident based on a user-reported suspicious email. Using a security intelligence management service, the IT and security operations application can further obtain enrichment data from an external intelligence feed service (e.g., providing information indicating a risk score for the email) and optionally from other internal historical data. The security intelligence management service can calculate a normalized score for the incident based on the information collected from the external service and the IT and security operations application can used the normalized score and optionally other enrichment data to automate an appropriate response. Similar processes can be applied to obtain security intelligence information from external and internal sources related to assessing Internet Protocol (IP) addresses, malware indicators, file hashes, email addresses, registry keys, bitcoin addresses, and the like.

The number of external data sources with which a security intelligence management service might interface can be numerous and can grow over time as support for new types of data enrichment services are provided. The security intelligence management service thus includes logic used to access each of the supported external data sources and to process the data obtained from such services (e.g., JavaScript Object Notation (JSON) formatted data or data in other formats). Implementation possibilities for the security intelligence management service include a standalone application that can run on a virtual or standalone environment on a physical host or, alternatively, as a containerized application running in a container platform. However, the computing resources uses to access and process the data from each of the multiple external data sources can have significantly varying resource demands. For example, some external sources might be accessed more frequently than others, the amount of data returned by certain data sources can be significantly larger than others, and the processing requirements for some types of data can be more than others.

In some examples, a security intelligence management service is deployed using computing resources provided by a cloud provider network. For example, an application implementing the service can be deployed to computing resources provided by a hardware virtualization service (e.g., physical servers, virtual machines (VMs), etc.) or a container service providing a cloud-based execution environment for containerized applications. In these examples, the amount of computing resources provisioned to support the application is scaled to accommodate the resources needed to access the most resource-intensive external data sources. This can however often lead to over-provisioning computing resources for the application functionality used to access less-resource intensive data sources, resulting in the inefficient use of computing resources for the service as a whole.

Furthermore, maintaining and further developing a security intelligence management service presents several challenges. For example, developers of the security intelligence management service might frequently modify the code used to access various data sources to address bugs or to add functionality and can add further functionality to access additional data sources added to the service over time. However, in the implementation and deployment scenarios described above, the security intelligence management service needs to be re-deployed in its entirety to make updates to the service available to users (e.g., the application needs to be reinstalled or containers redeployed across an entire fleet of computing resources). The frequent redeployment of the service in this manner can be error-prone and is not highly scalable, particularly as support for new external data sources and other functionality is added.

To address these challenges, among others, techniques are described herein for enabling a cloud-based data intake and query system, and applications designed to interface with a data intake and query system, to use a combination of a message queuing service, an on-demand code execution service, and optionally other services and computing resources provided by a cloud provider network to orchestrate execution of a security intelligence management service in a scalable fashion. In some examples, the code used to access and process data from individual external services is implemented as independently deployable packages that can be executed by an on-demand code execution service (such as, e.g., the AWS Lambda™ or Azure Functions™ serverless computing services). The execution of such functions can be triggered using a message queueing service, such that the orchestration of functions used to access any number of external services can be managed by a security intelligence management service without the need to provision dedicated computing resources for the entire service. The implementation of a security intelligence management service in this fashion provides for a more scalable and extensible service framework, thereby improving the service's ability to readily obtain and process intelligence data used to secure the operation of users' computing environments. As described herein, similar techniques can also be used by an IT and security operations application to execute externally authored code in a more secure and scalable fashion, among other benefits.

FIG. 1 is a block diagram of an example computing environment including a security intelligence management service that is configured to orchestrate the execution of code used to obtain intelligence data from external data sources according to some examples. In FIG. 1, a security intelligence management service 100 comprises software components executed by one or more electronic computing devices. In some examples, the computing devices and resources are provided and managed in part by a cloud provider network 102 (e.g., as part of a shared computing resource environment). In other examples, at least part of the security intelligence management service 100 executes on computing devices managed within an on-premises datacenter or other computing environment, or on computing devices located within a combination of cloud-based and on-premises computing environments.

In some examples, a security intelligence management service 100 is a type of security automation service that periodically collects data from external data sources 104 (e.g., including a data source 106A, data source 106B, . . . , and data source 106N) and processes the data for further enrichment and analysis. These external data sources can include, e.g., various types of intelligence feeds and services related to computer security threats and other types of computing environment operational information. The intelligence data obtained from such sources (e.g., intelligence data 108A, intelligence data 108B, . . . , intelligence data 108N) can include enrichment information used to provide the security intelligence management service 100, or other downstream applications and services (e.g., an IT and security operations application, security information and event management (STEM) application, etc.), with additional information (e.g., identifiers, threat scores, etc.) about IP addresses, files, malware indicators, and the like. The security intelligence management service 100 generally communicates with these external data sources 104 using third-party APIs or other interfaces provided by the various data sources. The number of data sources with which the security intelligence management service 100 is integrated can number in the tens, hundreds, or more, and the service can add support for additional external and internal data sources over time.

In some examples, client devices 110 can communicate with the security intelligence management service 100 and with a data intake and query system 122 in a variety of ways such as, for example, over an internet protocol via a web browser or other application, via a command line interface, via a software developer kit (SDK), and the like. In some examples, the client devices 110 can use one or more executable applications or programs from an application environment 124 to interface with the data intake and query system 122, such as the security intelligence management service 100. In some examples, the application environment 124 includes tools, software modules (e.g., computer executable instructions to perform a particular function), etc., that enable application developers to create computer executable applications to interface with a data intake and query system 122. The security intelligence management service 100, for example, can use aspects of the application environment 124 to interface with the data intake and query system 122 to obtain relevant data, process the data, and display it in a manner relevant to the security intelligence management service 100 context. The security intelligence management service 100 can further include additional backend services, middleware logic, front-end user interfaces, data stores, and other computing resources, and provides other facilities for ingesting use case specific data and interacting with that data, as described elsewhere herein.

As an example of using the application environment 124, the security intelligence management service 100 can include custom web-based interfaces that optionally leverage one or more user interface components and frameworks provided by the application environment 124. The security intelligence management service 100 further includes middleware business logic (including, e.g., the subscription manager 114 and scheduler 116) implemented on a middleware platform of the developer's choice. Furthermore, in some examples, a security intelligence management service 100 is instantiated and executed in a different isolated execution environment relative to the data intake and query system 122. As a non-limiting example, in examples where the data intake and query system 122 is implemented at least in part in a Kubernetes cluster, portions of the security intelligence management service 100 can execute in a different Kubernetes cluster (or other isolated execution environment system) and interact with the data intake and query system 122 via the gateway 126 (e.g., to access other services such as a search system 128, storage 130, an indexing system 132, intake system 134, etc.). Additional details related to a data intake and query system 122 are described elsewhere herein.

In some examples, a security intelligence management service 100 includes a subscription manager 114 and a scheduler 116. Among other functionality, a subscription manager 114 manages users' or applications' subscriptions to particular data sources 104. For example, a user of the security intelligence management service 100 can configure access to external data sources 104 relevant to types of data collected from the users' computing environment (e.g., if a user configures the collection of IP address information from networking devices in their environment, the user might configure the security intelligence management service 100 to periodically collect enrichment or threat score information related to the IP addresses from one or more external intelligence feeds).

In some examples, a scheduler 116 determines times at which the security intelligence management service 100 accesses external data sources 104 during operation. For example, the security intelligence management service 100 can be configured to access each external data source 104 configured for a user or application at a periodic interval (e.g., one a minute, or once every 10 minutes, or based on other detected events or conditions). As described in more detail herein, once the security intelligence management service 100 ingests intelligence data from an external data source 104, the service can perform additional processing such as, e.g., normalizing the data, assigning a score to the data. Once processed, the security intelligence management service 100 can provide the data to other downstream applications or services.

In FIG. 1, the circles labeled "1"-"8" are shown to illustrate an example process for orchestrating the execution of code used by the security intelligence management service 100 to obtain and process intelligence data from any number of external data sources 104. In some examples, at circle "1," the security intelligence management service 100 obtains information configuring a set of external data sources 104 from which intelligence data is to be gathered. As indicated above, the subscription manager 114 can be used to manage a set of external sources relevant to each user or application using the security intelligence management service 100, where some users or applications may configure the use more or fewer of the possible external data sources 104 with which the security intelligence management service 100 can interface. In some examples, a user can configure one or more external data source subscriptions using an interface provided by the security intelligence management service 100 or using an interface of another application or service integrated with the security intelligence management service. Although many of the examples described herein relate to a security intelligence management service 100 orchestrating the execution of functions used to obtain and process intelligence data from external data sources, in other examples, other types of applications and services can orchestrate other types of action workflows using the techniques described herein.

In some examples, at circle "2," a scheduler 116 of the security intelligence management service 100 determines times at which to obtain information from external data sources 104. As indicated, the scheduler 116 can determine times at which to access one or more of the external data sources 104 based on configuration information managed by the subscription manager 114 for one or more users or integrated applications that use the security intelligence management service 100. A time at which to access each external data source 104 can be determined independently of one another, such that the service may access some data sources more or less frequently than others.

In some examples, at circle "3A," responsive to the scheduler 116 determining to access a data source of the external data sources 104, the scheduler 116 sends a "pull" message 118 to a message queue 146 provided by the message queuing service 120. The message queuing service 120 represents a managed message queueing service provided by the provider network 102, which broadly enables users to decouple and scale microservices, serverless applications, and other systems. Using the message queuing service 120, applications can use a web services API to send, store, and receive messages between software components (e.g., between the security intelligence management service 100 and pull functions 136 and process functions 138, as described in more detail hereinafter). The message queues provided by the message queuing service 120 can include standard queues (e.g., providing best-effort ordering and at-least-once delivery), FIFO queues (e.g., providing a guarantee that messages are processed exactly once and in an exact order), or other types of message queues. The system illustrated in FIG. 1 includes the use of multiple types of messages, including pull messages 118, process messages 140, and update messages 142, and possibly other, which may be stored in a single message queue or across multiple separate message queues depending on the implementation.

In some examples, the message payload associated with a pull message 118 includes information to be used by a corresponding pull function 136 executed by the on-demand code execution service 144, where the function is used to access and obtain intelligence data from a particular data source of the external data sources 104. The message payload can include information such as, for example, a URL or other identifier of a particular data source, a name of the external source, parameters used to query the data source, and the like. The on-demand code execution service 144, for example, broadly represents a computing service that can execute user-provided source code (e.g., Python code, Java code, etc.) responsive to events. The types of events that can be configured to invoke the execution of code include, for example, events associated with other services (e.g., the addition of a message to a message queue, the addition of a file to a storage resource, etc.), in response to incoming HTTP requests, based on a defined schedule, and the like. In some examples, an on-demand code execution service 144 can also be referred to as a "serverless" compute service in that the service automates the management of the computing resources used to execute user code, thereby enabling users to run code without managing underlying servers or other infrastructure (e.g., where the on-demand code execution service 144 may make use of other managed compute services of a provider network 102 to provision VMs, containers, or other computing resources to execute the code).

In some examples, at circle "3B," the addition of a pull message 118 to the message queue 146 causes execution, by the on-demand code execution service 144, of a corresponding pull function 136. The creation of a pull function 136 can include configuration indicating that the function is to process messages contained in one or more specified message queues 146, or to process messages having certain characteristics in one or more specified message queues. Based on this configuration, the on-demand code execution service 144 polls the specified message queues and invokes a corresponding pull function 136 synchronously with an event that contains the queue messages. A pull function 136 can process messages from multiple queues (e.g., the security intelligence management service 100 might create different queues for different users, types of functions, data sources, etc.) or a same queue can be used for multiple functions (e.g., in some implementations, a same queue can be used to trigger the execution of pull and process functions depending on the characteristics of the messages in the queue). Once triggered, at circle "4," the pull function 136 accesses the specified data source 104 and obtains the requested intelligence data.

At a high level, the implementation of functionality used to access, obtain, and process data from any number of separate external data sources 104 using an on-demand code execution service 144 decouples the execution of such functionality from the security intelligence management service 100 and from the functionality used to access other data sources. Among other benefits, this decoupling enables the security intelligence management service 100 to right-size the resource needs for each request to an external data source (e.g., such that the service can provide pull/process functions associated with more resource-intensive data with more CPU, memory, etc., compared to other functions). For example, each invocation of a pull function 136 or process function 138 can include the configuration of resources associated with the function, such as memory, CPU, and concurrency. The invocation of a pull function 136 used to access a data source that historically returns large amounts of data can thus be allocated with more memory (e.g., up to 10,240 MB) and corresponding CPU resources compared to another pull function 136 used to access a data source that historically returns less data.

In some examples, the use of the on-demand code execution service 144 includes providing the service with a deployment package containing the scripts or compiled programs and their dependencies. Thus, the security intelligence management service 100 can deploy at any time various to the on-demand code execution service 144 packages containing the code used to access, pull, and process data from each of the external data sources 104. Furthermore, updates to the code used to access, pull, and process data from any particular data source can be updated independently by redeploying only the code used to access that data source without impacting the code used to interact with other data sources.

Furthermore, support for additional data sources can be added by simply deploying code for a new data source without impacting any of the deployment packages currently deployed for other data sources. In some examples, the security intelligence management service 100 can further deploy "layers" (e.g., represented by libraries/dependencies 152) representing libraries, custom runtimes, and other function dependencies that can be shared across other deployed packages. As described herein, the addition of newly deployed packages can be incorporated into the data gathering and processing pipelines described herein by causing the security intelligence management service 100 to add appropriate triggering messages to a corresponding queue managed by the message queuing service 120. The modularity of the described implementation significantly improves the scalability and extensibility of the service as updates are deployed or as support for new data sources is added.

In some examples, the execution of a pull function 136 can include the use of authentication information used to access a data source 104. In these examples, the security intelligence management service 100 can cause the authentication information to be stored and accessed using a secrets manager service (not shown) provided by the provider network 102. The secrets manager service can enable the pull or process functions to easily retrieve usernames and passwords, API keys, and other secrets throughout their lifecycle.

In some examples, at circle "5," intelligence data 150 obtained by a pull function 136 can be stored using a storage service 148. The storage service 148 can include, for example, an object storage service (e.g., providing logical storage containers for object data), a database service, or any other type of service used to provide a type of datastore that can be used to store data obtained by a pull function 136 from a data source. The stored intelligence data 150 can include raw text, JSON- or XML-formatted data, or data in any data format. In general, the data obtained by a pull function can be stored at a storage service 148 with minimal processing, where the processing of the data can be performed by a separate process function 138, as described hereinafter.

In some examples, the pull functions 136 and process functions 138 can optionally send status information back to the security intelligence management service 100 as part of execution. For example, during execution, a pull function 136 can send status information back to the security intelligence management service 100 indicating whether a requested pull from a data source was successful, an amount of data retrieved, execution metrics (e.g., execution time, memory used, etc.), and the like. In some examples, the security intelligence management service 100 can store some or all the status data returned by pull/process functions for historical analyses (e.g., for analyses used to determine an amount of resources to allocate for future pull and process function invocations).

In some examples, at circle "6A," a pull function 136 sends a process message 140 to a message queue 146 associated a process function 138 to indicate that the intelligence data 150 has been obtained from the external data source 104 and is ready for further processing. A process message 140 can include, for example, some or all the following information: an identifier of the type of pull function 136 sending the message, an identifier of the external data source 104 from which the data was obtained, a storage location at a storage service 148 at which the intelligence data is stored, and the like.

In some examples, at circle "6B," a process message 140 causes execution, by the on-demand code execution service, of a corresponding process function 138. As indicated above, the on-demand code execution service 144 can be configured to invoke a process function 138 responsive to detecting one or more messages in a message queue 146. Similar to the pull functions 136, a process function 138 can be invoked with an amount of computing resources allocated to it (e.g., CPU, memory, etc.) depending on the expected processing requirements of the function. Depending on the type of intelligence data 150 obtained from an external data source 104, a process function 138 can perform a variety of processing actions on the data such as, e.g., normalizing the information (e.g., possibly involving lookups to other data sources), assigning a risk score to the data (e.g., a normalized risk score across multiple different types of external data sources), filtering the information, and the like. The post-processing of the data, e.g., can assist other downstream applications or services using the data in other contexts. For example, a normalized risk score can be used by an IT and security operations application to present information in an incident review interface, to determine one or more remediating actions or playbooks to execute, etc. In some examples, once the processing data is complete, at circle "7," the process function 138 can send an update message 142 indicating a status of the processing, a storage location of the processed data, and other information that may be relevant to the security intelligence management service's use of the data.

In some examples, at circle "8," the security intelligence management service 100 detects the update message 142 indicating that the obtaining and processing of the intelligence data 150 is complete. The service can use the update message to determine that the scheduled pull from the external source was successful, obtain and provide the intelligence data 150 for subsequent use by the service or other applications, and perform any cleanup operations (e.g., optionally deleting the intelligence data 150 from storage). For example, at circle "9" in FIG. 1, the security intelligence management service 100 can provide the processed data to the data intake and query system 122 for use by other downstream applications or services. The security intelligence management service 100 can perform the described processes to obtain data from external data sources 104 any number of times according to a scheduled defined by the scheduler 116, from any number of external data sources 104, and using any level of concurrency (e.g., data can be pulled from two or more separate external data sources concurrently by sending multiple messages to the appropriate message queues 146), thereby improving the scalability and performance of the service as a whole.

In some examples, additional functions can be provided for failure handling purposes. For example, the security intelligence management service 100 can deploy functions to the on-demand code execution service 144 that are configured to be invoked responsive to an error message generated by a pull function 136 or process function 138, where the failure handling function can perform various failure handling operations such as, e.g., diagnosing connectivity to a relevant external data source 104, attempting to re-invoke the failed function, cleaning up any incomplete data, etc.

In some examples, users of the security intelligence management service 100 can provide custom code for accessing an external data source 104. For example, the security intelligence management service 100 can provide an interface that enables users to provide a deployment package containing pull and process functions for an external data source 104 not currently supported by the service. In this example, the security intelligence management service 100 can deploy the custom code to the on-demand code execution service 144 and invoke the functions upon request from the user. Due in part to the isolated execution environments provided by the on-demand code execution service 144, the execution of externally authored code runs little risk of compromising the stability of the security intelligence management service 100, or of the other pull and process functions, thereby enabling the security intelligence management service 100 to enable users to readily extend the functionality of the service.

Figure 2:
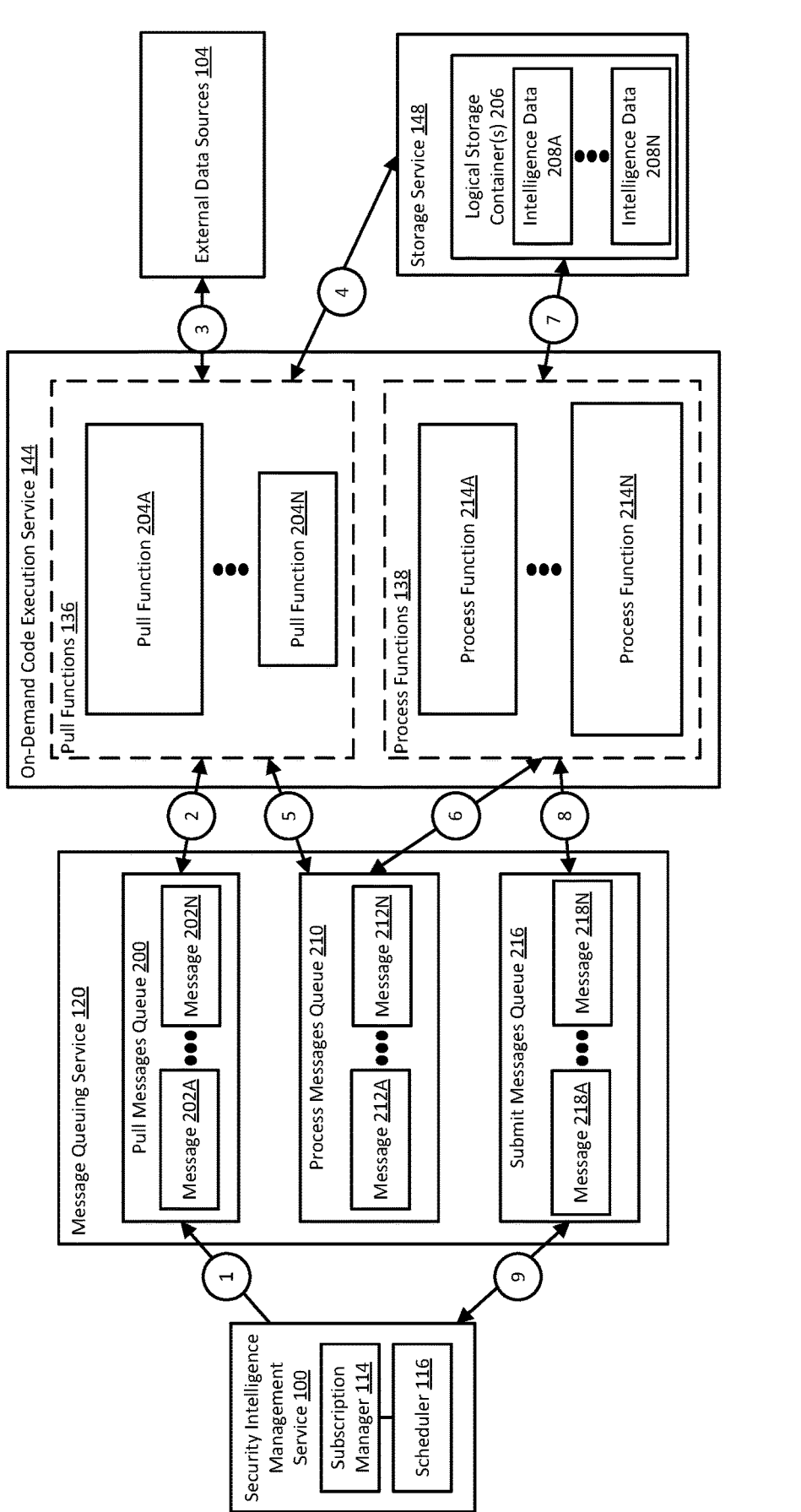
FIG. 2 illustrates additional details related to the use of a message queuing service and an on-demand code execution service to orchestrate the execution of code used by a security intelligence management service to obtain intelligence data from external data sources according to some examples.

FIG. 2 illustrates additional details related to the use of a message queuing service and on-demand code execution service to orchestrate the interaction with a third-party intelligence data source by a security service according to some examples. In particular, the example process illustrated in FIG. 2 provides additional detail related to the orchestrated execution of pull and process functions by a security intelligence management service 100 by sending messages to appropriate message queues, and to the variable allocation of resources to pull and process functions according to an expected amount of resources to be used by each function invocation.

In some examples, at circle "1," a security intelligence management service 100 determines to obtain intelligence data from an external data source 104 and sends a message to a pull message queue 200. In this example, the security intelligence management service 100 has provisioned separate message queues for each of pull messages, process messages, and submit messages, although in other implementations a single queue can be used for all messages. As shown, the pull message queue 200 can queue any number of messages (e.g., message 202A, . . . message 202N), which can be processed in order or possibly out of order depending on a configuration of the queue. As indicated, the security intelligence management service 100 can send the messages to the pull message queue 200 according to a schedule determined by the scheduler 116 and subscription information for each of the external data sources. An individual message 202A, for example, can include an indication of an external data source 104 for which the request relates, a URL or other identifier used to access the data source, query parameters used to obtain the desired data, etc.

In some examples, at circle "2," a pull function 136 is invoked (e.g., one of pull function 204A, . . . , pull function 204N) responsive to the on-demand code execution service 144 detecting that a message is available in the pull message queue 200. Each of the separate pull functions illustrated in FIG. 2, for example, may correspond to a function implementing logic for accessing a particular external data source 104 from a plurality of external data sources. For example, the pull function 204A might implement logic used to access an external threat intelligence service providing information about IP addresses, while the pull function 204N implements logic to access a threat intelligence feed providing information about malware indicators.

In FIG. 2, the various pull functions are shown using different size boxes to indicate that each function can be allocated a different amount of computing resources for execution (e.g., including memory, CPU, etc.). As indicated, each function can be allocated different amounts of computing resources depending on an expected amount of resources to be used to obtain and store data from a particular external data source 104. In some examples, the dynamic scaling of the pull functions 136, process functions 138, and other system components can be implemented at least in part on historical data. The historical data can, for example, be collected based on execution metrics obtained from the on-demand code execution service 144 indicating, e.g., an amount of time each function executed, an amount of data obtained by the function, an amount of memory used by the function. As indicated in relation to FIG. 1, this information can be stored by the security intelligence management service 100 and periodically analyzed to determine an appropriate amount of resources to allocate for each function.

At circle "3," the invoked pull function 136 access and obtains data from a corresponding external data source 104 and, at circle "4," stores the data using a storage service 148. In the example of FIG. 2, the pull function stores the data using a logical storage container 206 provided by a storage service 148, where the data obtained by various pull functions 136 can be stored in separate logical storage containers 206 (e.g., stored separately as intelligence data 208A, . . . , intelligence data 208N). As indicated, in other examples, other types of data stores such as databases and the like can be alternatively used to store the data.

At circle "5," the pull function 136 sends a message to a process message queue 210 indicating that the function has obtained and stored the intelligence data. As indicated, the message (e.g., one of message 212A, . . . , message 212N) can include information indicating the external data source from which the data was obtained, a storage location of the data (e.g., an identifier of a logical storage container 206 containing the data), and the like.

At circle "6," a process function 138 (e.g., one of process function 214A, . . . , process function 214N) is configured be invoked responsive to the availability of a message in the process message queue 210. Similar to the pull functions 136, each of the process functions 138 can include logic used to process a certain type of data pulled from a particular external data source 104. Furthermore, each of the process functions 138 can similarly be allocated a respective amount of computing resources depending on expected processing requirements. At circle "7," a process function 138 can access the intelligence data to be processed based on an identifier included in a process message and process the data accordingly. In some examples, the processed data can be stored in a same logical storage container 206 or optionally moved to a different storage location.

Once the processing is complete, at circle "8," the process function 138 sends a message to a submit message queue 216 (e.g., one of message 218A, . . . , message 218N) to indicate that the processing is complete and the intelligence data is ready for further processing. In some examples, at circle "9," the security intelligence management service 100 is in turn configured to monitor the submit message queue 216 for the existence of such messages and, upon receipt, to obtain the processed data and to provide the data to any relevant downstream applications or services. As illustrated in FIG. 2, the entire end-to-end process, utilizing entirely decoupled pull and process functions, is orchestrated using various message queues, where the pipeline of function invocations can be modified simply by using different messages indicating which pull and process functions to invoke. As indicated above, this decoupling enables the security intelligence management service 100 to readily modify pull and process functions without affecting the execution of other functions, to add new functions to access new data sources, etc., all with minimal changes to the central security intelligence management service 100.

The example shown in FIG. 1 and FIG. 2 illustrated the orchestrated execution of code used by a security intelligence management service to obtain data from external data sources. As indicated herein, other applications and services can make use of similar techniques to orchestrate the execution of code in a cloud provider network for security and scalability reasons. As an example, an IT and security operations application can similarly use an on-demand code execution service 144 to orchestrate the execution of externally authored code to be executed as part of a playbook or functionality of the application. For example, as described in more detail herein, a playbook is comprised of code segments executed according to a program flow. As part of these playbooks, users can optionally create custom actions in which a user provides custom code, uploads the code, and the IT and security operations application can execute the code as part of the playbook. The ability to use an on-demand code execution service 144 to execute such code enables the IT and security operations application to isolate the code's execution from the rest of the service, thereby minimizing the chances for buggy or malicious code to impact the service.

Figure 3:
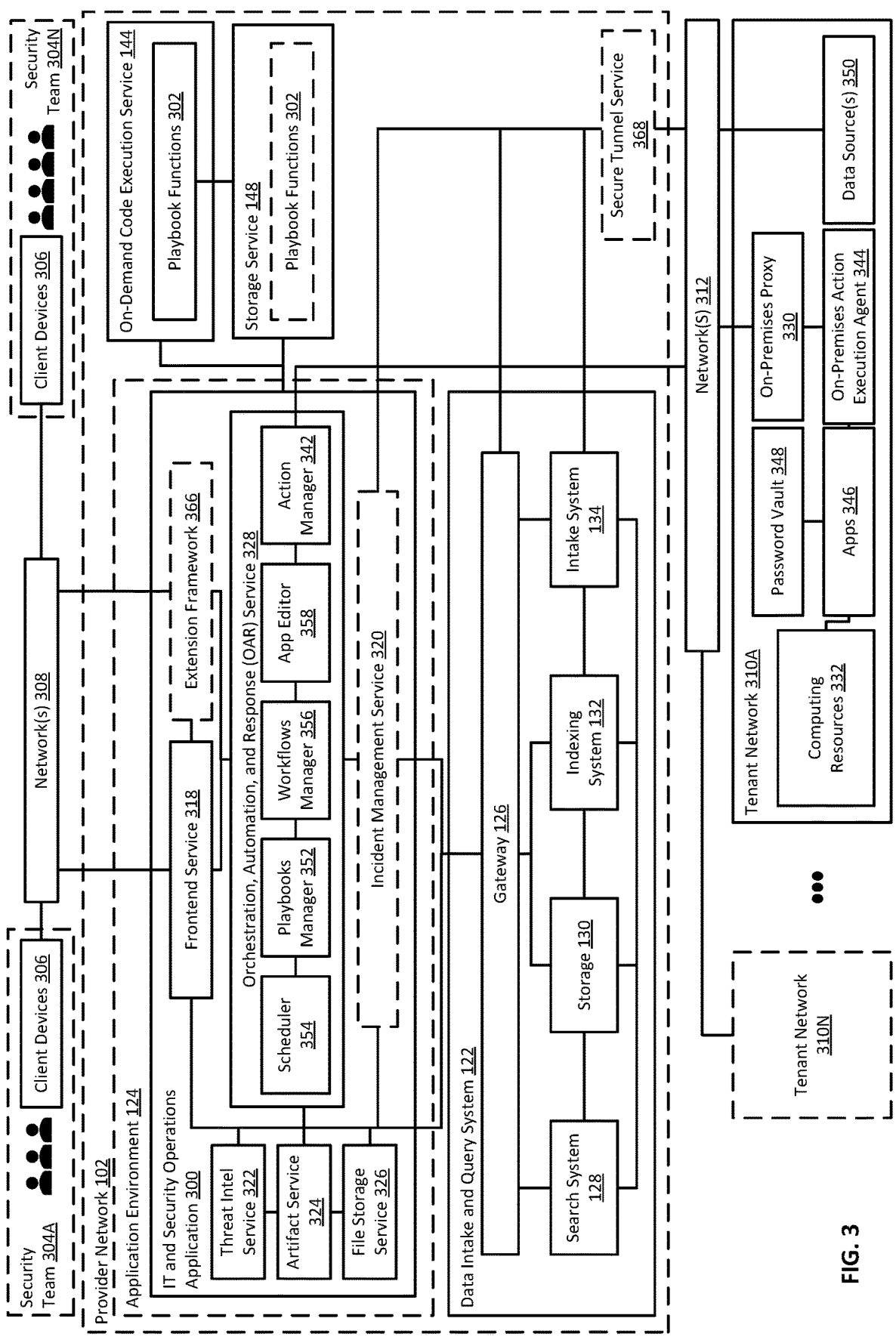
FIG. 3 is a block diagram of an example computing environment including an IT and security operations application that is configured to orchestrate the execution of code as part of playbook executions according to some examples.

FIG. 3 is a block diagram of an example computing environment including an IT and security operations application that enables users to create, modify, and test apps using a built-in app editor according to some examples. As shown in FIG. 3, an IT and security operations application 300 comprises software components executed by one or more electronic computing devices. In some examples, the computing devices are provided by a cloud provider network 102 (e.g., as part of a shared computing resource environment). In other examples, an IT and security operations application 300 executes on computing devices managed within an on-premises datacenter or other computing environment, or on computing devices located within a combination of cloud-based and on-premises computing environments.

The IT and security operations application 300 broadly enables users to perform security orchestration, automation, and response operations involving components of an organization's computing infrastructure (or components of multiple organizations' computing infrastructures). Among other benefits, an IT and security operations application 300 enables security teams and other users to automate repetitive tasks, to efficiently respond to security incidents and other operational issues, and to coordinate complex workflows across security teams and diverse IT environments. For example, users associated with various IT operations or security teams (sometimes referred to herein as "analysts," such as analysts that may be part of example one or more of security team 304A, . . . , security team 304N) can use client computing devices 306 to interact with the IT and security operations application 300 via one or more network(s) 308 to perform operations relative to IT environments for which they are responsible (such as, for example, one or more of tenant network 310A, . . . , tenant network 310N, which may be accessible over one or more network(s) 312, where network(s) 312 may be the same or different from network(s) 308). Although only two security teams are depicted in the example of FIG. 3, in general, any number of separate security teams can concurrently use the IT and security operations application 300 to manage any number of respective tenant networks, where each individual security team may be responsible for one or more tenant networks.

In some examples, users can interact with an IT and security operations application 300 and a data intake and query system 122 (described in more detail elsewhere herein) using client devices 306. The client devices 306 can communicate with the IT and security operations application 300 and with data intake and query system 122 in a variety of ways such as, for example, over an internet protocol via a web browser or other application, via a command line interface, via a software developer kit (SDK), and the like. In some examples, the client devices 306 can use one or more executable applications or programs from an application environment 124 to interface with the data intake and query system 122, such as the IT and security operations application 300. In some examples, the application environment 124 include tools, software modules (e.g., computer executable instructions to perform a particular function), etc., that enable application developers to create computer executable applications to interface with an IT and security operations application 300 and/or data intake and query system 122. The IT and security operations application 300, for example, can use aspects of the application environment 124 to interface with the data intake and query system 122 to obtain relevant data, process the data, and display it in a manner relevant to the IT operations and security context. As shown, the IT and security operations application 300 further includes additional backend services, middleware logic, front-end user interfaces, data stores, and other computing resources, and provides other facilities for ingesting use case specific data and interacting with that data, as described elsewhere herein.

As an example of using the application environment 124, the IT and security operations application 300 includes custom web-based interfaces (e.g., provided at least in part by a frontend service 318) that optionally leverage one or more user interface components and frameworks provided by the application environment 124. In some examples, an IT and security operations application 300 includes, for example, a "mission control" interface or set of interfaces. In this context, "mission control" refers to any type of interface or set of interfaces that broadly enable users to obtain information about their IT environments, to configure automated actions, playbooks, etc., and to perform operations related to IT and security infrastructure management. The IT and security operations application 300 further includes middleware business logic (including, for example, an optional incident management service 320, a threat intelligence service 322, an artifact service 324, a file storage service 326, and an orchestration, automation, and response (OAR) service 328) implemented on a middleware platform of the developer's choice. Furthermore, in some examples, an IT and security operations application 300 is instantiated and executed in a different isolated execution environment relative to the data intake and query system 122. As a non-limiting example, in examples where the data intake and query system 122 is implemented at least in part in a Kubernetes cluster, the IT and security operations application 300 can execute in a different Kubernetes cluster (or other isolated execution environment system) and interact with the data intake and query system 122 via the gateway 126.

A user can initially configure an IT and security operations application 300 using a web-based console or other interface provided by the IT and security operations application 300 (for example, as provided by a frontend service 318 of the IT and security operations application 300). For example, users can use a web browser or other application to navigate to the IP address or hostname associated with the IT and security operations application 300 to access console interfaces, dashboards, and other interfaces used to interact with various aspects of the application. The initial configuration can include creating and configuring user accounts, configuring connection settings to one or more tenant networks (for example, including settings associated with one or more on-premises proxies 330 used to establish connections between on-premises networks and the IT and security operations application 300 running in a provider network 102 or elsewhere), and performing other optional configurations.

In some examples, a user (also referred to herein as a "customer," "tenant," or "analyst") of an IT and security operations application 300 can create one or more user accounts to be used by a security team and other users associated with the tenant. A user of the IT and security operations application 300 typically desires to use the application to manage one or more tenant networks for which the user is responsible (illustrated by example tenant networks

310A, . . . , 310N in FIG. 1). A tenant network includes any number of computing resources 332 operating as part of a corporate network or other networked computing environment with which a tenant is associated. Although the tenant networks 310A, . . . , 310N are shown as separate from the provider network 102 in FIG. 3, more generally, a tenant network can include components hosted in an on-premises network, in a provider network 102, or combinations of both (for example, as a hybrid cloud network).

In some examples, each of the computing resources 332 in a tenant network can potentially serve as a source of incident data to an IT and security operations application 300, a computing resource against which actions can be performed by the IT and security operations application 300, or both. The computing resources 332 can include various types of computing devices, software applications, and services including, but not limited to, a data intake and query system 122 (which itself can ingest and process machine data generated by other computing resources 332), a security information and event management (SIEM) system, a representational state transfer (REST) client that obtains or generates incident data based on the activity of other computing resources 332, software applications (including operating systems, databases, web servers, etc.), routers, intrusion detection systems and intrusion prevention systems (IDS/IDP), client devices (for example, servers, desktop computers, laptops, tablets, etc.), firewalls, and switches. The computing resources 332 can execute upon any number separate computing devices and systems within a tenant network.

During operation, data intake and query systems, STEM systems, REST clients, and other system components of a tenant network obtain operational, performance, and security data from computing resources 332 in the network, analyze the data, and may identify potential IT and security-related incidents from time to time. A data intake and query system in a tenant network, for example, might identify potential IT-related incidents based on the execution of correlation searches against data ingested and indexed by the system, as described elsewhere herein. Other data sources 350 can obtain incident and security-related data using other processes. Once obtained, data indicating such incidents is sent to the data intake and query system 122 or IT and security operations application 300 via an on-premises proxy 330. For example, once a data intake and query system identifies a possible security threat or other IT-related incident based on data ingested by the data intake and query system, data representing the incident can be sent to the data intake and query system 122 via a REST API endpoint implemented by a gateway 126 or a similar gateway of the IT and security operations application 300. As mentioned elsewhere herein, a data intake and query system 122 or IT and security operations application 300 can ingest, index, and store data received from each tenant network in association with a corresponding tenant identifier such that each tenant's data is segregated from other tenant data (for example, when stored in common storage 130 of the data intake and query system 122 or in a multi-tenant database of the IT and security operations application 300).

In some examples, once an IT and security operations application 300 obtains incident data, either directly from a tenant network or indirectly via a data intake and query system 122, the IT and security operations application 300 analyzes the incident data and enables users to investigate, determine possible remediation actions, and perform other operations. These actions can include default actions initiated and performed within a tenant network without direct interaction from user and can further include suggested actions provided to users associated with the relevant tenant networks. Once the suggested actions are determined, these actions can be presented in a "mission control" dashboard or other interface accessible to users of the IT and security operations application 300. Based on the suggested actions, a user can select one or more particular actions to be performed and the IT and security operations application 300 can carry out the selected actions within the corresponding tenant network. In the example of FIG. 3, an orchestration, automation, and response (OAR) service 328 of the IT and security operations application 300, which includes an action manager 342, can cause actions to be performed in a tenant network by sending action requests via network 312 to an on-premises proxy 330, which further interfaces with an on-premises action execution agent (for example, on-premises action execution agent 344 in tenant network 310A). In this example, the on-premises action execution agent 344 is implemented to receive action requests from an action manager 342 and to carry out requested actions against computing resources 332 using apps 346 (sometimes alternatively referred to as "connectors") and optionally a password vault 348 (e.g., to authenticate an app to one or more computing resources 332).

In some examples, to execute actions against computing resources in tenant networks and elsewhere, an IT and security operations application 300 uses a unified security language that includes commands usable across a variety of hardware and software products, applications, and services. To execute a command specified using the unified security language, in some examples, the IT and security operations application 300 (possibly via an on-premises action execution agent 344) uses one or more apps 346 to translate the commands into the one or more processes, languages, scripts, etc., necessary to implement the action at one or more particular computing resources 332. For example, a user might provide input requesting the IT and security operations application 300 to remove an identified malicious process from multiple computing systems in the tenant network 310A, where two or more of the computing systems are associated with different software configurations (for example, different operating systems or operating system versions). Accordingly, in some examples, the IT and security operations application 300 can send an action request to an on-premises action execution agent 344, which then uses one or more apps 346 to translate the command into the necessary processes to remove each instance of the malicious process on the varying computing systems within the tenant network (including the possible use of credentials and other information stored in the password vault 348).

In some examples, an IT and security operations application 300 includes a playbooks manager 352 that enables users to automate actions or series of actions by creating digital "playbooks" that can be executed by the IT and security operations application 300. At a high level, a playbook represents a customizable computer program that can be executed by an IT and security operations application 300 to automate a wide variety of possible operations related to an IT environment. These operations—such as quarantining devices, modifying firewall settings, restarting servers, and so forth—are typically performed by various security products by abstracting product capabilities using an integrated "app model."

As mentioned, an IT and security operations application 300 may be implemented as a collection of interworking services that each carry out various functionality as described herein. In the example shown in FIG. 3, the IT and security operations application 300 includes an incident management service 320, a frontend service 318, an artifact service 324, a threat intelligence service 322, a file storage service 326, and an orchestration, automation, and response (OAR) service 328. The set of services comprising the IT and security operations application 300 in FIG. 3 are provided for illustrative purposes only; in other examples, an IT and security operations application 300 can be comprised of more or fewer services and each service may implement the functionality of one or more of the services shown.

In some examples, an incident management service 320 is responsible for obtaining incidents or events (sometimes also referred to as "notables"), either directly from various data sources 350 in tenant networks or directly based on data ingested by the data intake and query system 122 via the gateway 126. In some examples, the frontend service 318 provides user interfaces to users of the application, among other processes described herein. Using these user interfaces, users of the IT and security operations application 300 can perform various application-related operations, view displays of incident-related information, and can configure administrative settings, license management, content management settings, and so forth. In some examples, an artifact service 324 manages artifacts associated with incidents received by the application, where incident artifacts can include information such as IP addresses, usernames, file hashes, and so forth. In some examples, a threat intelligence service 322 obtains data from external or internal sources to enable other services to perform various incident data enrichment operations. As one non-limiting example, if an incident is associated with a file hash, a threat intelligence service 322 can be used to correlate the file hash with external threat feeds to determine whether the file hash has been previously identified as malicious. In some examples, a file storage service 326 enables other services to store incident-related files, such as email attachments, files, and so forth. In some examples, an OAR service 328 performs a wide range of OAR capabilities such as action execution (via an action manager 342), playbook execution (via a playbooks manager 352), scheduling work to be performed (via a scheduler 354), user approvals and so forth as workflows (via a workflows manager 356), among other functionality described herein. According to examples described herein, an OAR service 328 includes an app editor 358 that enables users to create, modify, and test apps (e.g., including apps 346 utilized within a local tenant network, apps used by an IT and security operations application 300 running in a provider network 102, or used elsewhere) using the built-in app editor, as described in more detail herein.

The operation of an IT and security operations application 300 generally begins with the ingestion of data related to various types of incidents involving computing resources of various tenant networks (for example, computing resources 332 or other data sources 350 of a tenant network 310A). In some examples, users configure an IT and security operations application 300 to obtain, or "ingest," data from one or more defined data sources 350, where such data sources can be any type of computing device, application, or service that supplies information that users may want to store or act upon, and where such data sources may include one or more of the computing resources 332 or data sources which generate data based on the activity of one or more computing resources 332. As mentioned, examples of data sources include, but are not limited to, a data intake and query system such as the SPLUNK® ENTERPRISE system, a SIEM system, a REST client, applications, routers, intrusion detection systems (IDS)/intrusion prevention systems (IDP)

systems, client devices, firewalls, switches, or any other source of data identifying potential incidents in tenants' IT environments. Some of these data sources may themselves collect and process data from various other data generating components such as, for example, web servers, application servers, databases, firewalls, routers, operating systems, and software applications that execute on computer systems, mobile devices, sensors, Internet of Things (IoT) devices, etc. The data generated by the various data sources can be represented in any of a variety of data formats.

In some examples, data can be sent from tenant networks to an IT and security operations application 300 using any of several different mechanisms. As one example, data can be sent to data intake and query system 122, processed by an intake system 134 (e.g., including indexing of resulting event data by an indexing system 132, thereby further causing the event data to be accessible to a search system 128), and obtained by an incident management service 320 of the IT and security operations application 300 via a gateway 126. As another example, components can send data from a tenant network directly to the incident management service 320, for example, via a REST endpoint.

In some examples, data ingested by an IT and security operations application 300 from configured data sources 350 can be represented in the IT and security operations application 300 by data structures referred to as "incidents," "events," "notables," or "containers". Here, an incident or event is a structured data representation of data ingested from a data source and that can be used throughout the IT and security operations application 300. In some examples, an IT and security operations application 300 can be configured to create and recognize different types of incidents depending on the corresponding type of data ingested, such as "IT incidents" for IT operations-related incidents, "security incidents" for security-related incidents, and so forth. An incident can further include any number of associated events and "artifacts," where each event or artifact represents an item of data associated with the incident. As a non-limiting example, an incident used to represent data ingested from an anti-virus service and representing a security-related incident might include an event indicating the occurrence of the incident and associated artifacts indicating a name of the virus, a hash value of a file associated with the virus, a file path on the infected endpoint, and so forth.

In some examples, each incident of an IT and security operations application 300 can be associated with a "status" or "state" that may change over time. Analysts and other users can use this status information, for example, to indicate to other analysts which incidents an analyst is actively investigating, which incidents have been closed or resolved, which incidents are awaiting input or action, and the like. Furthermore, an IT and security operations application 300 can use the transitions of incidents from one status to another to generate various metrics related to analyst efficiency and other measurements of analyst teams. For example, the IT and security operations application 300 can be configured with a number of default statuses, such as "new" or "unknown" to indicate incidents that have not yet been analyzed, "in progress" for incidents that have been assigned to an analyst and are under investigation, "pending" for incidents that are waiting input or action from an analyst, and "resolved" for incidents that have been addressed by an assigned analyst. An amount of time that elapses between these statuses for a given incident can be used to calculate various measures of analyst and analyst team efficiency, such as measurements of a mean time to resolve incidents, a mean time to respond to incidents, a mean time to detect an incident that is a "true positive," a mean dwell time reflecting an amount of time taken to identify and remove threats from an IT environment, among other possible measures. Analyst teams can also create custom statuses to indicate incident states that may be more specific to the way the particular analyst team operates, and further create custom efficiency measurements based on such custom statuses.

In some examples, an IT and security operations application 300 also generates and stores data related to its operation and activity conducted by tenant users including, for example, playbook data, workbook data, user account settings, configuration data, and historical data (such as, for example, data indicating actions taken by users relative to particular incidents or artifacts, data indicating responses from computing resources based on action executions, and so forth), in one or more multi-tenant databases 338. In other examples, some or all the data above is stored in storage managed by the data intake and query system 122 and accessed via the gateway 126. These multi-tenant database(s) can operate on a same computer system as the IT and security operations application 300 or at one or more separate database instances. As mentioned, in some examples, the storage of such data by the data intake and query system 122 and IT and security operations application 300 for each tenant is generally segregated from data associated with other tenants based on tenant identifiers stored with the data or other access control mechanisms.

In some examples, an IT and security operations application 300 defines many different types of "actions," which represent high-level, vendor- and product-agnostic primitives that can be used throughout the IT and security operations application 300. Actions generally represent simple and user-friendly verbs that are used to execute actions in playbooks or manually through other user interfaces of the IT and security operations application 300, where such actions can be performed against one or more computing resources in an IT environment. In many cases, a same action defined by the IT and security operations application 300 can be carried out on computing resources associated with different vendors or configurations via action translation processes performed by apps of the platform, as described in more detail elsewhere herein. Examples of actions that can be defined by an IT and security operations application 300 include a "get process dump" action, a "block IP address" action, a "suspend VM" action, a "terminate process" action, and so forth.

In some examples, an IT and security operations application 300 enables connectivity with various IT computing resources in a provider network 102 and in tenant networks 310A, . . . , 310N, including IT computing resources from a wide variety of third-party IT and security technologies, and further enables the ability to execute actions against those computing resources via apps (such as the apps 346 in tenant network 310A and apps implemented as part of the IT and security operations application 300). In general, an app 346 represents program code that provides an abstraction layer (for example, via one or more libraries, APIs, or other interfaces) to one or more of hundreds of possible IT and security-related products and services and which exposes lists of actions supported by those products and services. Each app 346 can also define which types of computing resources that the app can operate on, an entity that created the app, among other information.

As one example, an IT and security operations application 300 can be configured with an app 346 that enables the application 300 to communicate with a VM product provided by a third-party vendor. In this example, the app for the VM product enables the IT and security operations application 300 to take actions relative to VM instances within a user's IT environment, including starting and stopping the VMs, taking VM snapshots, analyzing snapshots, and so forth. In order for the app 346 to communicate with a VM manager or with individual instances, the app 346 can be configured with login credentials, hostnames or IP addresses, and so forth, for each instance with which communication is desired (or the app may be configured to obtain such information from a password vault 348). Other apps 346 can be created and made available for VM products from other third-party vendors, where those apps may be configured to translate some or all the same actions that are available with respect to the first type of VM product. In general, apps 346 enable interaction with virtually any type of computing resource 332 in an IT environment and can be added and updated over time to support new types of computing resources.

In some examples, computing resources 332 (sometimes referred to as computing assets) include physical or virtual components within an organization with which an IT and security operations application 300 communicates (for example, via apps as described above). Examples of computing resources 332 include, but are not limited to, servers, endpoint devices, applications, services, routers, and firewalls. A computing resource 332 can be represented in an IT and security operations application 300 by data identifying the computing resource, including information used to communicate with the device or service such as, for example, an IP address, automation service account, username, password, etc. In some examples, one or more computing resources 332 can be configured as a source of incident information that is ingested by an IT and security operations application 300. The types of computing resources 332 that can be configured in the IT and security operations application 300 may be determined in some cases based on which apps 346 are installed for a particular user. In some examples, automated actions can be configured with respect to various computing resources 332 using playbooks, described in more detail elsewhere herein. Each computing resource 332 may be hosted in an on-premises tenant network, a cloud-based provider network, or any other network or combination thereof. In some scenarios, one or more computing resources 332 can be hosted in a cloud-based environment that is not managed directly by a tenant of the IT and security operations application 300, where actions can be performed against such resources using REST-based APIs or Secure Shell (SSH) connections with the resources.

In some examples, the operation of an IT and security operations application 300 includes the ability to create and execute customizable playbooks. At a high level, a playbook comprises computer program code and possibly other data that can be executed by an IT and security operations application 300 to carry out an automated set of actions (for example, as managed by a playbooks manager 352 as part of the OAR service 328). In some examples, a playbook is comprised of one or more functions, or codeblocks or function blocks, where each function contains program code that performs defined functionality when the function is encountered during execution of the playbook of which it is a part. As an example, a first function block of a playbook might implement an action that upon execution affects one or more computing resources 332 (e.g., by configuring a network setting, restarting a server, etc.); another function block might filter data generated by the first function block in some manner; yet another function block might obtain information from an external service, and so forth. A playbook is further associated with a control flow that defines an order in which the IT and security operations application 300 executes the function blocks of the playbook, where a control flow may vary at each execution of a playbook depending on particular input conditions (e.g., where the input conditions may derive from attributes associated with an incident triggering execution of the playbook or based on other accessible values).

In some examples, the IT and security operations application 300 described herein provides a visual playbook editor (for example, as an interface provided by a frontend service 318) that allows users to visually create and modify playbooks. Using a visual playbook editor GUI, for example, users can codify a playbook by creating and manipulating a displayed graph including nodes and edges, where each of the nodes in the graph represents one or more function blocks that each perform one or more defined operations during execution of the playbook, and where the edges represent a control flow among the playbook's function blocks. In this manner, users can craft playbooks that perform complex sequences of operations without having to write some or any of the underlying code. The visual playbook editor interfaces further enable users to supplement or modify the automatically generated code by editing the code associated with a visually designed playbook, as desired.

In some examples, an IT and security operations application 300 provides one or more playbook management interfaces that enable users to locate and organize playbooks associated with a user's account. A playbook management interface can display a list of playbooks that are associated with a user's account and further provide information about each playbook such as, for example, a name of the playbook, a description of the playbook's operation, a number of times the playbook has been executed, a last time the playbook was executed, a last time the playbook was updated, tags or labels associated with the playbook, a repository at which the playbook and the associated program code is stored, a status of the playbook, and the like.

Users can create a new digital playbook starting from a playbook management interface or using another interface provided by the IT and security operations application 300. Using a playbook management interface, for example, a user can select a "create new playbook" interface element and the IT and security operations application 300 causes display of a visual playbook editor interface including a graphical canvas on which users can add nodes representing operations to be performed during execution of the playbook, where the operations are implemented by associated source code that can be automatically generated by the visual playbook editor, and add connections or edges among the nodes defining an order in which the represented operations are to be performed upon execution.

The creation of a graph representing a playbook includes the creation of connections between function blocks, where the connections are represented by edges that visually connect the nodes of the graph representing the collection of function blocks. These connections among the playbook function blocks indicate a program flow for the playbook, defining an order in which the operations specified by the playbook blocks are to occur. For example, if a user creates a connection that links the output of a block A to the input of a block B, then block A executes to completion before execution of block B begins during execution of the playbook. In this manner, output variables generated by the execution of block A can be used by block B (and any other subsequently executed blocks) during playbook execution.

Once a user has codified a playbook using a visual playbook editor or other interface, the playbook can be saved (for example, in a multi-tenant database and in association with one or more user accounts) and run by the IT and security operations application 300 on-demand. As illustrated in the example playbooks above, a playbook includes a "start" block that is associated with source code that begins execution of the playbook. More particularly, the IT and security operations application 300 executes the function represented by the start block for a playbook with container context comprising data about the incident against which the playbook is executed, where the container context may be derived from input data from one or more configured data sources. A playbook can be executed manually in response to a user providing input requesting execution of the playbook, or playbooks can be executed automatically in response to the IT and security operations application 300 obtaining input events matching certain criteria. In examples where the source code associated with a playbook is based on an interpreted programming language (for example, such as the Python programming language), the IT and security operations application 300 can execute the source code represented by the playbook using an interpreter and without compiling the source code into compiled code. In other examples, the source code associated with a playbook can first be compiled into byte code or machine code the execution of which can be invoked by the IT and security operations application 300.

In some examples, an optional extension framework 366 allows users to extend the user interfaces, data content, and functionality of an IT and security operations application 300 in various ways to enhance and enrich users' workflow and investigative experiences. Example types of extensions enabled by the extension framework 366 include modifying or supplementing GUI elements (including, e.g., tabs, menu items, tables, dashboards, visualizations, etc.) and other components (including, e.g., response templates, connectors, playbooks, etc.), where users can implement these extensions at pre-defined extension points of the IT and security operations application 300.

In some examples, components external to the IT and security operations application 300 interface with an intermediary secure tunnel service 368 to send communications to, and to receive communications from, an IT and security operations application 300 running in a provider network 102. In some examples, the secure tunnel service 368 operates as a service that establishes WebSocket or other types of secure connections to endpoint devices. As one example, the secure tunnel service 368 can establish a first secure connection to the IT and security operations application 300 and a second secure connection to an on-premises proxy 330 and an on-premises action execution agent 344 executing in a tenant network 310A, where each connection is established using a handshake technique with the respective endpoints. Once established, the connection enables two-way communications between the IT and security operations application 300 (e.g., via a separate proxy implemented by the IT and security operations application 300) and the on-premises action execution agent 344 without the need to open a port in a firewall or perform other configurations to a network associated with the tenant network 310A. In some examples, the secure tunnel service 368 is a cloud-based service (e.g., executing using computing resources provided by a provider network 102) configured to transfer data between an IT and security operations application 300 and computing devices located on networks external to the provider network 102, including on-premises action execution agents, mobile devices, and the like. In other examples, the secure tunnel service 368 executes using computing resources located outside of a cloud-based environment.

In some examples, the secure tunnel service 368 performs authentication operations with other components (e.g., the IT and security operations application 300 and an on-premises proxy 330 or on-premises action execution agent 344) to establish trust and then establishes secure communications channels with those components, where the secure tunnel service 368 and other components transmit secure communications using the secure communications channels. In some examples, the secure tunnel service 368 provides end-to-end encryption (E2EE) of communications between the IT and security operations application 300 and an on-premises action execution agent 344 via an on-premises proxy 330 by transmitting one or more encrypted data packets between the IT and security operations application 300 and the on-premises proxy 330. In some examples, communications sent through the secure tunnel service 368 are in the form of data packets, where each data packet includes, for example, a payload and a device identifier for a destination device that is to receive the data packet. In other examples, the data packet can also include a device identifier for the source device or an instance identifier that indicates an IT and security operations application instance associated with the data packet. In some examples, the data packet is encrypted prior to being transmitted to the secure tunnel service 368, e.g., using a public key of an asymmetric key pair generated by a receiving device. While in some examples, the secure tunnel service 368 decrypts the data packet before sending the data packet to its intended destination, in other examples, the secure tunnel service 368 forwards the encrypted data packet to its intended destination without performing a decryption process.

In some examples, the IT and security operations application 300 and on-premises proxy 330 communicates with the secure tunnel service 368 across network(s) 312. As indicated herein, the networks 312 can be communications networks, such as a local area network (LAN), wide area network (WAN), cellular network (e.g., LTE, HSPA, 3G, 4G, and/or any other network based on cellular technologies), and/or networks using any of wired, wireless, terrestrial microwave, or satellite links. In some examples, after an on-premises action execution agent 344 is installed and executed within a tenant network 310A, the on-premises action execution agent 344 uses an on-premises proxy 330 to initiate a process to establish a secure connection (e.g., a gRPC Remote Procedure Calls (gRPC) over HTTP/2 connection) with a secure tunnel service 368. For example, the secure tunnel service 368 may establish the secure connection and associate the secure connection with a device identifier for the on-premises proxy 330.

In some examples, the secure tunnel service 368 maintains a database that stores document data structures and optionally stores keys. This database, for example, can be a structure query language (SQL) database, or a NoSQL database, such as an AMAZON® DynamoDB. In some examples, the database includes a key store that stores encryption keys, including single-use session keys and long-term keys associated with devices that send E2EE communications. In other examples, the secure tunnel service 368 does not store encryption keys and routes messages without the use of a key store. In some examples, the database also includes a routing table that includes address information associated with devices registered with the secure tunnel service 368 with which the service has established secure communications. The secure tunnel service 368, for example, can send queries to the database to determine, based on a device identifier in a particular data packet, the address of the intended recipient of the particular data packet.

As illustrated in FIG. 3, the secure tunnel service 368 may not directly communicate with an on-premises action execution agent 344 but communicate instead through an on-premises proxy 330. As indicated herein, the on-premises proxy 330 is a process executing in the tenant network 310A and that operates as a gateway between the secure tunnel service 368 and the IT and security operations application 300. The on-premises proxy 330 is configured to receive messages from the secure tunnel service 368 and forward the messages to the on-premises action execution agent 344 for processing. The on-premises proxy 330 can also be configured to generate and send messages (e.g., notifications, alerts, etc.) IT and security operations application 300 via the secure tunnel service 368. In some examples, the on-premises proxy 330 can also send messages to configured mobile devices in accordance with a push notification service, such as the APPLE® Push Notification service (APN), or GOOGLE® Cloud Messaging (GCM). In some examples, the on-premises proxy 330 is configured to perform the management, generation, and registration of encryption keys used to communicate with the secure tunnel service 368.

As indicated, in some cases, users want the ability to modify the generated code for code blocks of a playbook. For example, a user might want to modify the functionality of an existing block within a playbook, or to create a custom block for a playbook to add entirely new functionality. In some examples, the IT and security operations application 300 enables users to use a playbook editor to modify the code associated with playbook actions or to add new types of playbook actions. Once saved as part of a playbook, the IT and security operations application 300 (e.g., using the playbooks manager 352) can execute the playbook upon command.

In some examples, the IT and security operations application 300 causes a custom function to be executed as part of a playbook using an on-demand code execution service 144. For example, the IT and security operations application 300 can send a deployable code package containing the code for a custom playbook function 302 to the on-demand code execution service 144 and, upon reaching the custom code block during execution of the playbook, request invocation of the function by sending a request to the on-demand code execution service 144. In some examples, the IT and security operations application 300 can initiate the execution of a playbook function 302 storing the executable command in a logical storage container provided by a storage service 148. This can enable the IT and security operations application 300, for example, to invoke functions associated with program code that may be larger than the invocation payload size limit of the on-demand code execution service 144. Once stored in the logical storage container, or otherwise invoked, the on-demand code execution service 144 can execute the function and return the results to the IT and security operations application 300. As indicated, the execution of such functions in the isolated environment of the on-demand code execution service 144 can help ensure that their execution does not impact the stability of the IT and security operations application 300.

FIG. 4 is a flowchart illustrating an example process 400 for orchestrating the execution of code used by a security intelligence management service to obtain data from external data sources according to some examples. The example process 400 can be implemented, for example, by a computing device that comprises a processor and a non-transitory computer-readable medium. The non-transitory computer readable medium can be storing instructions that, when executed by the processor, can cause the processor to perform the operations of the illustrated process 400. Alternatively or additionally, the process 400 can be implemented using a non-transitory computer-readable medium storing instructions that, when executed by one or more processors, case the one or more processors to perform the operations of the process 400 of FIG. 4.

The process 400 includes, at block 402, identifying, by a security intelligence management service running in a cloud provider network, a data source external to the cloud provider network and from which data is to be obtained by the security intelligence management service, wherein the data relates to a potential incident identified by an application associated with the security intelligence management service, and wherein the potential incident affects the security or operation of a computing environment.

The process 400 further includes, at block 404, causing execution of a first function using an on-demand code execution service of the cloud provider network, wherein the first function obtains the data from the data source.

The process 400 further includes, at block 406, causing execution of a second function using the on-demand code execution service, wherein the second function performs at least one operation on the data obtained from the data source to obtain processed data.

The process 400 further includes, at block 408, providing the processed data to the application associated with the security intelligence management service.

In some examples, causing execution of the first function includes sending a first message to a first message queue provisioned by the security intelligence management service using a message queueing service of the cloud provider network, wherein execution of the first function is triggered responsive to the on-demand code execution service detecting the first message in the first message queue, wherein causing execution of the second function includes sending a second message to a second message queue provisioned by the security intelligence management service using the message queueing service, and wherein execution of the second function is triggered responsive to the on-demand code execution service detecting the second message in the second message queue.

In some examples, the data source is a first data source of a plurality of data sources external to the cloud provider network and from which the security intelligence management service obtains data, wherein the data is first data, and wherein the method further comprises: identifying, by the security intelligence management service, a second data source of the plurality of data sources from which second data is to be obtained by the security intelligence management service; causing execution of a third function using the on-demand code execution service of the cloud provider network, wherein the third function obtains the second data from the second data source; and causing execution of a fourth function using the on-demand code execution service, wherein the fourth function performs at least one operation on the second data obtained from the second data source.

In some examples, the operations further include determining, by a scheduler of the security intelligence management service, a time at which to initiate obtaining the data from the data source, wherein the time at which to initiate obtaining the data is determined based on configuration data associated with the data source.

In some examples, the second function sends an update message to a message queue indicating that the processed data is available for subsequent processing.

In some examples, the first function stores the data obtained from the data source in a logical storage container provided by a storage service of the cloud provider network, and wherein the second function obtains the data from the logical storage container.

In some examples, the data source external to the cloud provider network is one of: a cybersecurity intelligence service, an issue or project tracking service, an adversary and malware intelligence service, a virus intelligence service, a security information and event management (SIEM) service, a logging service, or a cyberattack response service.

In some examples, the operations further include assigning, by the second function, a risk score to a data object relevant to the data obtained from the data source.

In some examples, the first function queries the data source using at least one query parameter provided to the first function by the security intelligence management service.

In some examples, the security intelligence management service configures the first function to be allocated a first amount of computing resources during execution by the on-demand code execution service, and wherein the security intelligence management service configures the second function to be allocated a second amount of computing resources during execution that differs from the first amount of computing resources.

In some examples, the operations further include determining, based on historical data reflecting past executions of the first function, an amount of computing resources to allocate to the first function during execution by the on-demand code execution service; and configuring the on-demand code execution service to allocate the amount of computing resources to invocations of the first function.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 5:
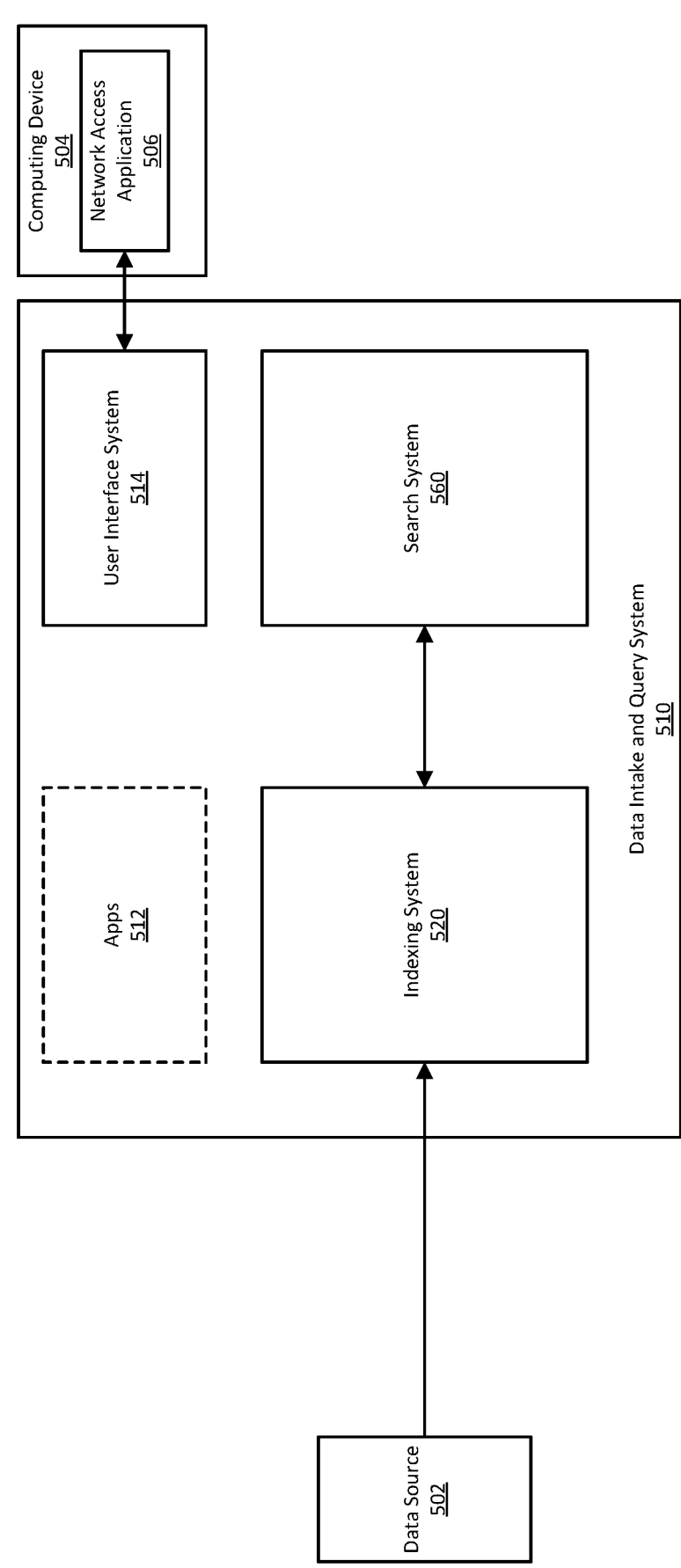
FIG. 5 is a block diagram illustrating an example computing environment that includes a data intake and query system according to some examples.

FIG. 5 is a block diagram illustrating an example computing environment 500 that includes a data intake and query system 510. The data intake and query system 510 obtains data from a data source 502 in the computing environment 500 and ingests the data using an indexing system 520. A search system 560 of the data intake and query system 510 enables users to navigate the indexed data. Though drawn with separate boxes, in some implementations the indexing system 520 and the search system 560 can have overlapping components. A computing device 504, running a network access application 506, can communicate with the data intake and query system 510 through a user interface system 514 of the data intake and query system 510. Using the computing device 504, a user can perform various operations with respect to the data intake and query system 510, such as administration of the data intake and query system 510, management and generation of "knowledge objects," initiating of searches, and generation of reports, among other operations. The data intake and query system 510 can further optionally include apps 512 that extend the search, analytics, and/or visualization capabilities of the data intake and query system 510.

The data intake and query system 510 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 510 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power to retain data.

In various examples, the program code for the data intake and query system 510 can execute on a single computing device, or may be distributed over multiple computing devices. For example, the program code can include instructions for executing both indexing and search components (which may be part of the indexing system 520 and/or the search system 560, respectively), and can be executed on a computing device that also provides the data source 502. As another example, the program code can execute on one computing device, where the program code executes both indexing and search components, while another copy of the program code executes on a second computing device that provides the data source 502. As another example, the program code can execute only an indexing component or only a search component. In this example, a first instance of the program code that is executing the indexing component and a second instance of the program code that is executing the search component can be executing on the same computing device or on different computing devices.

The data source 502 of the computing environment 500 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 502 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 520 obtains machine date from the data source 502 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 520 does not require prior knowledge of the structure of incoming data (e.g., the indexing system 520 does not need to be provided with a schema describing the data). Additionally, the indexing system 520 retains a copy of the data as it was received by the indexing system 520 such that the original data is always available for searching (e.g., no data is discarded, though, in some examples, the indexing system 520 can be configured to do so).

The search system 560 searches the data stored by the indexing system 520. As discussed in greater detail below, the search system 560 enables users associated with the computing environment 500 (and possibly also other users) to navigate the data, generate reports, and visualize results in "dashboards" output using a graphical interface. Using the facilities of the search system 560, users can obtain insights about the data, such as retrieving events from an index, calculating metrics, searching for specific conditions within a rolling time window, identifying patterns in the data, and predicting future trends, among other examples. To achieve greater efficiency, the search system 560 can apply map-reduce methods to parallelize searching of large volumes of data. Additionally, because the original data is available, the search system 560 can apply a schema to the data at search time. This allows different structures to be applied to the same data, or for the structure to be modified if or when the content of the data changes. Application of a schema at search time may be referred to herein as a late-binding schema technique.

The user interface system 514 provides mechanisms through which users associated with the computing environment 500 (and possibly others) can interact with the data intake and query system 510. These interactions can include configuration, administration, and management of the indexing system 520, initiation and/or scheduling of queries to the search system 560, receipt or reporting of search results, and/or visualization of search results. The user interface system 514 can include, for example, facilities to provide a command line interface or a web-based interface.

Users can access the user interface system 514 using a computing device 504 that communicates with data intake and query system 510, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 500. For example, a person can log in as a particular user and, using the user's digital information, can access the data intake and query system 510. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 504 can provide a human-machine interface through which a person can have a digital presence in the computing environment 500 in the form of a user. The computing device 504 is an electronic device having one or more processors and a memory capable of storing instructions for execution by the one or more processors. The computing device 504 can further include input/output (I/O) hardware and a network interface. Applications executed by the computing device 504 can include a network access application 506, which can a network interface of the client computing device 504 to communicate, over a network, with the user interface system 514 of the data intake and query system 510. The user interface system 514 can use the network access application 506 to generate user interfaces that enable a user to interact with the data intake and query system 510. A web browser is one example of a network access application. A shell tool can also be used as a network access application. In some examples, the data intake and query system 510 is an application executing on the computing device 504. In such examples, the network access application 506 can access the user interface system 514 without needed to go over a network.

The data intake and query system 510 can optionally include apps 512. An app of the data intake and query system 510 is a collection of configurations, knowledge objects (a user-defined entity that enriches the data in the data intake and query system 510), views, and dashboards that may provide additional functionality, different techniques for searching the data, and/or additional insights into the data. The data intake and query system 510 can execute multiple applications simultaneously. Example applications include an information technology service intelligence application, which can monitor and analyze the performance and behavior of the computing environment 500, and an enterprise security application, which can include content and searches to assist security analysts in diagnosing and acting on anomalous or malicious behavior in the computing environment 500.

Though FIG. 5 illustrates only one data source, in practical implementations, the computing environment 500 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 500, the data intake and query system 510 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud and has digital access to resources provided by the computing devices only to the extent that such access is enabled by the provider entity.

In some implementations, the computing environment 500 can include on-prem and cloud-based computing resources, or only cloud-based resources. For example, an entity may have on-prem computing devices and a private cloud. In this example, the entity operates the data intake and query system 510 and can choose to execute the data intake and query system 510 on an on-prem computing device or in the cloud. In another example, a provider entity operates the data intake and query system 510 in a public cloud and provides the functionality of the data intake and query system 510 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 510. In some implementations, the entity providing the data intake and query system 510 is itself subscribing to the cloud services of a cloud service provider. As an example, a first entity provides computing resources under a public cloud service model, a second entity subscribes to the cloud services of the first provider entity and uses the cloud computing resources to operate the data intake and query system 510, and a third entity can subscribe to the services of the second provider entity in order to use the functionality of the data intake and query system 510. In this example, the data sources are associated with the third entity, users accessing the data intake and query system 510 are associated with the third entity, and the analytics and insights provided by the data intake and query system 510 are for purposes of the third entity's operations.

Figure 6:
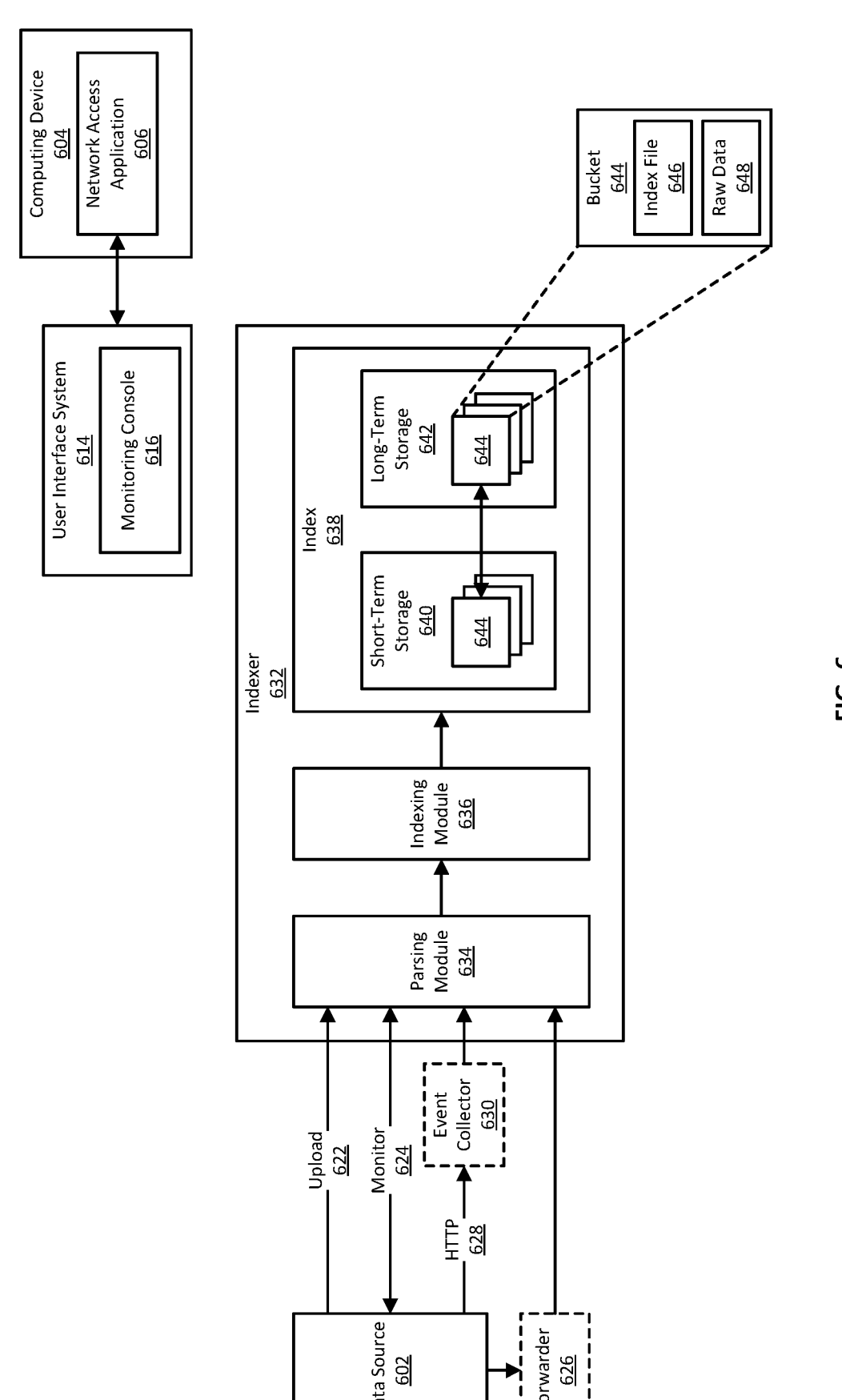
FIG. 6 is a block diagram illustrating in greater detail an example of an indexing system of a data intake and query system according to some examples.

FIG. 6 is a block diagram illustrating in greater detail an example of an indexing system 620 of a data intake and query system, such as the data intake and query system 1310 of FIG. 13. The indexing system 620 of FIG. 6 uses various methods to obtain machine data from a data source 602 and stores the data in an index 638 of an indexer 632. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 620 enables the data intake and query system to obtain the machine data produced by the data source 602 and to store the data for searching and retrieval.

Users can administer the operations of the indexing system 620 using a computing device 604 that can access the indexing system 620 through a user interface system 614 of the data intake and query system. For example, the computing device 604 can be executing a network access application 606, such as a web browser or a terminal, through which a user can access a monitoring console 616 provided by the user interface system 614. The monitoring console 616 can enable operations such as: identifying the data source 602 for indexing; configuring the indexer 632 to index the data from the data source 602; configuring a data ingestion method; configuring, deploying, and managing clusters of indexers; and viewing the topology and performance of a deployment of the data intake and query system, among other operations. The operations performed by the indexing system 620 may be referred to as "index time" operations, which are distinct from "search time" operations that are discussed further below.

The indexer 632, which may be referred to herein as a data indexing component, coordinates and performs most of the index time operations. The indexer 632 can be implemented using program code that can be executed on a computing device. The program code for the indexer 632 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 632. In some implementations, the indexer 632 executes on the computing device 604 through which a user can access the indexing system 620. In some implementations, the indexer 632 executes on a different computing device.

The indexer 632 may be executing on the computing device that also provides the data source 602 or may be executing on a different computing device. In implementations wherein the indexer 632 is on the same computing device as the data source 602, the data produced by the data source 602 may be referred to as "local data." In other implementations the data source 602 is a component of a first computing device and the indexer 632 executes on a second computing device that is different from the first computing device. In these implementations, the data produced by the data source 602 may be referred to as "remote data." In some implementations, the first computing device is "on-prem" and in some implementations the first computing device is "in the cloud." In some implementations, the indexer 632 executes on a computing device in the cloud and the operations of the indexer 632 are provided as a service to entities that subscribe to the services provided by the data intake and query system.

For a given data produced by the data source 602, the indexing system 620 can be configured to use one of several methods to ingest the data into the indexer 632. These methods include upload 622, monitor 624, using a forwarder 626, or using HyperText Transfer Protocol (HTTP 628) and an event collector 630. These and other methods for data ingestion may be referred to as "getting data in" (GDI) methods.

Using the upload 622 method, a user can instruct the indexing system to specify a file for uploading into the indexer 632. For example, the monitoring console 616 can include commands or an interface through which the user can specify where the file is located (e.g., on which computing device and/or in which directory of a file system) and the name of the file. Once uploading is initiated, the indexer 632 processes the file, as discussed further below. Uploading is a manual process and occurs when instigated by a user. For automated data ingestion, the other ingestion methods are used.

The monitor 624 method enables the indexing system 632 to monitor the data source 602 and continuously or periodically obtain data produced by the data source 602 for ingestion by the indexer 632. For example, using the monitoring console 616, a user can specify a file or directory for monitoring. In this example, the indexing system 632 can execute a monitoring process that detects whenever data is added to the file or directory and causes the data to be sent to the indexer 632. As another example, a user can specify a network port for monitoring. In this example, a monitoring process can capture data received at or transmitting from the network port and cause the data to be sent to the indexer 632. In various examples, monitoring can also be configured for data sources such as operating system event logs, performance data generated by an operating system, operating system registries, operating system directory services, and other data sources.

Monitoring is available when the data source 602 is local to the indexer 632 (e.g., the data source 602 is on the computing device where the indexer 632 is executing). Other data ingestion methods, including forwarding and the event collector 630, can be used for either local or remote data sources.

A forwarder 626, which may be referred to herein as a data forwarding component, is a software process that sends data from the data source 602 to the indexer 632. The forwarder 626 can be implemented using program code that can be executed on the computer device that provides the data source 602. A user launches the program code for the forwarder 626 on the computing device that provides the data source 602. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 626 can provide various capabilities. For example, the forwarder 626 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 626 can break the data into individual events (event generation is discussed further below) and send the events to a receiver. Other operations that the forwarder 626 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 630 provides an alternate method for obtaining data from the data source 602. The event collector 630 enables data and application events to be sent to the indexer 632 using HTTP 628. The event collector 630 can be implemented using program code that can be executing on a computing device. The program code may be a component of the data intake and query system or can be a standalone component that can be executed independently of the data intake and query system and operates in cooperation with the data intake and query system.

To use the event collector 630, a user can, for example using the monitoring console 616 or a similar interface provided by the user interface system 614, enable the event collector 630 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 602 as an alternative method to using a username and password for authentication.

To send data to the event collector 630, the data source 602 is supplied with a token and can then send HTTP 628 requests to the event collector 630. To send HTTP 628 requests, the data source 602 can be configured to use an HTTP client and/or to use logging libraries such as those supplied by Java, JavaScript, and NET libraries. An HTTP client enables the data source 602 to send data to the event collector 630 by supplying the data, and a Uniform Resource Identifier (URI) for the event collector 630 to the HTTP client. The HTTP client then handles establishing a connection with the event collector 630, transmitting a request containing the data, closing the connection, and receiving an acknowledgment if the event collector 630 sends one. Logging libraries enable HTTP 628 requests to the event collector 630 to be generated directly by the data source. For example, an application can include or link a logging library, and through functionality provided by the logging library manage establishing a connection with the event collector 630, transmitting a request, and receiving an acknowledgement.

An HTTP 628 request to the event collector 630 can contain a token, a channel identifier, event metadata, and/or event data. The token authenticates the request with the event collector 630. The channel identifier, if available in the indexing system 620, enables the event collector 630 to segregate and keep separate data from different data sources. The event metadata can include one or more key-value pairs that describe the data source 602 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 630 extracts events from HTTP 628 requests and sends the events to the indexer 632. The event collector 630 can further be configured to send events or event data to one or more indexers. Extracting the events can include associating any metadata in a request with the event or events included in the request. In these implementations, event generation by the indexer 632 (discussed further below) is bypassed, and the indexer 632 moves the events directly to indexing. In some implementations, the event collector 630 extracts event data from a request and outputs the event data to the indexer 632, and the indexer generates events from the event data. In some implementations, the event collector 630 sends an acknowl-edgement message to the data source 602 to indicate that the event collector 630 has received a particular request form the data source 602, and/or to indicate to the data source 602 that events in the request have been added to an index.

The indexer 632 ingests incoming data and transforms the data into searchable knowledge in the form of events. In the data intake and query system, an event is a single piece of data that represents activity of the component represented in FIG. 6 by the data source 602. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 632 can include a parsing module 634 and an indexing module 636 for generating and storing the events. The parsing module 634 and indexing module 636 can be modular and pipelined, such that one component can be operating on a first set of data while the second component is simultaneously operating on a second sent of data. Additionally, the indexer 632 may at any time have multiple instances of the parsing module 634 and indexing module 636, with each set of instances configured to simultaneously operate on data from the same data source or from different data sources. The parsing module 634 and indexing module 636 are illustrated to facilitate discussion, with the understanding that implementations with other components are possible to achieve the same functionality.

The parsing module 634 determines information about event data, where the information can be used to identify events within the event data. For example, the parsing module 634 can associate a source type with the event data. A source type identifies the data source 602 and describes a possible data structure of event data produced by the data source 602. For example, the source type can indicate which fields to expect in events generated at the data source 602 and the keys for the values in the fields, and possibly other information such as sizes of fields, an order of the fields, a field separator, and so on. The source type of the data source 602 can be specified when the data source 602 is configured as a source of event data. Alternatively, the parsing module 634 can determine the source type from the event data, for example from an event field or using machine learning.

Other information that the parsing module 634 can determine includes timestamps. In some cases, an event includes a timestamp as a field, and the timestamp indicates a point in time when the action represented by the event occurred or was recorded by the data source 602 as event data. In these cases, the parsing module 634 may be able to determine from the source type associated with the event data that the timestamps can be extracted from the events themselves. In some cases, an event does not include a timestamp and the parsing module 634 determines a timestamp for the event, for example from a name associated with the event data from the data source 602 (e.g., a file name when the event data is in the form of a file) or a time associated with the event data (e.g., a file modification time). As another example, when the parsing module 634 is not able to determine a timestamp from the event data, the parsing module 634 may use the time at which it is indexing the event data. As another example, the parsing module 634 can use a user-configured rule to determine the timestamps to associate with events.

The parsing module 634 can further determine event boundaries. In some cases, a single line (e.g., a sequence of characters ending with a line termination) in event data represents one event while in other cases, a single line represents multiple events. In yet other cases, one event may span multiple lines within the event data. The parsing module 634 may be able to determine event boundaries from the source type associated with the event data, for example from a data structure indicated by the source type. In some implementations, a user can configure rules the parsing module 634 can use to identify event boundaries.

The parsing module 634 can further extract data from events and possibly also perform transformations on the events. For example, the parsing module 634 can extract a set of fields for each event, such as a host or hostname, source or source name, and/or source type. The parsing module 634 may extract certain fields by default or based on a user configuration. Alternatively or additionally, the parsing module 634 may add fields to events, such as a source type or a user-configured field. As another example of a transformation, the parsing module 634 can anonymize fields in events to mask sensitive information, such as social security numbers or account numbers. Anonymizing fields can include changing or replacing values of specific fields. The parsing component 634 can further perform user-configured transformations.

The parsing module 634 outputs the results of processing incoming event data to the indexing module 636, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 632 can be configured to identify searchable segments that are parts of fields, searchable segments that are entire fields, or both. The parsing module 634 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 646, to find event data that matches a search query. In some implementations, segmentation can alternatively be performed by the forwarder 626. Segmentation can also be disabled, in which case the indexer 632 will not build a lexicon for the event data. When segmentation is disabled, the search system searches the event data directly.

Building index data structures generates the index 638. The index 638 is a storage data structure on a storage device (e.g., a disk drive or other physical device for storing digital data). The storage device may be a component of the computing device on which the indexer 632 is operating (referred to herein as local storage) or may be a component of a different computing device (referred to herein as remote storage) that the indexer 638 has access to over a network. The indexer 632 can include more than one index and can include indexes of different types. For example, the indexer 632 can include event indexes, which impose minimal structure on stored data and can accommodate any type of data. As another example, the indexer 632 can include metrics indexes, which use a highly structured format to handle the higher volume and lower latency demands associated with metrics data.

The indexing module 636 organizes files in the index 638 in directories referred to as buckets. The files in a bucket 644 can include raw data files, index files, and possibly also other metadata files. As used herein, "raw data" means data as when the data was produced by the data source 602, without alteration to the format or content. As noted previously, the parsing module 634 may add fields to event data and/or perform transformations on fields in the event data, and thus a raw data file 648 can include, in addition to or instead of raw data, what is referred to herein as enriched raw data. The raw data file 648 may be compressed to reduce disk usage. An index file 646, which may also be referred to herein as a "time-series index" or tsidx file, contains metadata that the indexer 632 can use to search a corresponding raw data file 648. As noted above, the metadata in the index file 646 includes a lexicon of the event data, which associates each unique keyword in the event data in the raw data file 648 with a reference to the location of event data within the raw data file 648. The keyword data in the index file 646 may also be referred to as an inverted index. In various implementations, the data intake and query system can use index files for other purposes, such as to store data summarizations that can be used to accelerate searches.

A bucket 644 includes event data for a particular range of time. The indexing module 636 arranges buckets in the index 638 according to the age of the buckets, such that buckets for more recent ranges of time are stored in short-term storage 640 and buckets for less recent ranges of time are stored in long-term storage 642. Short-term storage 640 may be faster to access while long-term storage 642 may be slower to access. Buckets may move from short-term storage 640 to long-term storage 642 according to a configurable data retention policy, which can indicate at what point in time a bucket is old enough to be moved.

A bucket's location in short-term storage 640 or long-term storage 642 can also be indicated by the bucket's status. As an example, a bucket's status can be "hot," "warm," "cold," "frozen," or "thawed." In this example, hot bucket is one to which the indexer 632 is writing data and the bucket becomes a warm bucket when the indexer 632 stops writing data to it. In this example, both hot and warm buckets reside in short-term storage 640. Continuing this example, when a warm bucket is moved to long-term storage 642, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 620 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each bucket must exist within the cluster), and indexers to which buckets are copied may be selected to optimize distribution of data across the cluster.

A user can view the performance of the indexing system 620 through the monitoring console 616 provided by the user interface system 614. Using the monitoring console 616, the user can configure and monitor an index cluster, and see information such as disk usage by an index, volume usage by an indexer, index and volume size over time, data age, statistics for bucket types, and bucket settings, among other information.

Figure 7:
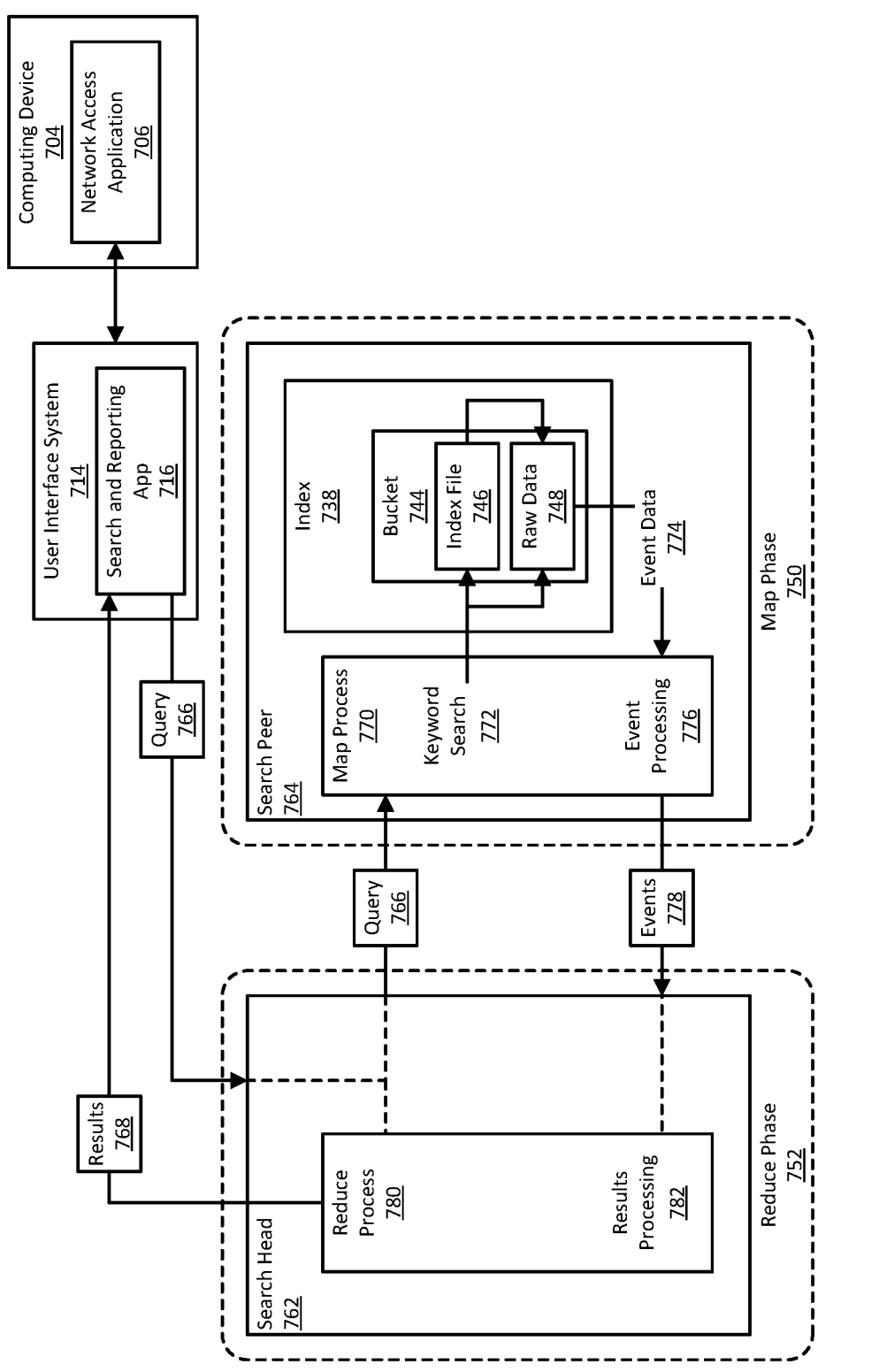
FIG. 7 is a block diagram illustrating in greater detail an example of the search system of a data intake and query system according to some examples.

FIG. 7 is a block diagram illustrating in greater detail an example of the search system 760 of a data intake and query system, such as the data intake and query system 1310 of FIG. 13. The search system 760 of FIG. 7 issues a query 766 to a search head 762, which sends the query 766 to a search peer 764. Using a map process 770, the search peer 764 searches the appropriate index 738 for events identified by the query 766 and sends events 778 so identified back to the search head 762. Using a reduce process 782, the search head 762 processes the events 778 and produces results 768 to respond to the query 766. The results 768 can provide useful insights about the data stored in the index 738. These insights can aid in the administration of information technology systems, in security analysis of information technology systems, and/or in analysis of the development environment provided by information technology systems.

The query 766 that initiates a search is produced by a search and reporting app 716 that is available through the user interface system 714 of the data intake and query system. Using a network access application 706 executing on a computing device 704, a user can input the query 766 into a search field provided by the search and reporting app 716. Alternatively or additionally, the search and reporting app 716 can include pre-configured queries or stored queries that can be activated by the user. In some cases, the search and reporting app 716 initiates the query 766 when the user enters the query 766. In these cases, the query 766 maybe referred to as an "ad-hoc" query. In some cases, the search and reporting app 716 initiates the query 766 based on a schedule. For example, the search and reporting app 716 can be configured to execute the query 766 once per hour, once per day, at a specific time, on a specific date, or at some other time that can be specified by a date, time, and/or frequency. These types of queries maybe referred to as scheduled queries.

The query 766 is specified using a search processing language. The search processing language includes commands that the search peer 764 will use to identify events to return in the search results 768. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 766 to include sequential commands, where a subsequent command may operate on the results of a prior command. As an example, sequential commands may be separated in the query 766 by a vertical line ("I" or "pipe") symbol.

In addition to one or more search commands, the query 766 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 766 occurs in two broad phases: a map phase 750 and a reduce phase 752. The map phase 750 takes place across one or more search peers. In the map phase 750, the search peers locate event data that matches the search terms in the search query 766 and sorts the event data into field-value pairs. When the map phase 750 is complete, the search peers send events that they have found to one or more search heads for the reduce phase 752. During the reduce phase 752, the search heads process the events through commands in the search query 766 and aggregate the events to produce the final search results 768.

A search head, such as the search head 762 illustrated in FIG. 7, is a component of the search system 760 that manages searches. The search head 762, which may also be referred to herein as a search management component, can be implemented using program code that can be executed on a computing device. The program code for the search head 762 can be stored on a non-transitory computer-readable medium and from this medium can be loaded or copied to the memory of a computing device. One or more hardware processors of the computing device can read the program code from the memory and execute the program code in order to implement the operations of the search head 762.

Upon receiving the search query 766, the search head 762 directs the query 766 to one or more search peers, such as the search peer 764 illustrated in FIG. 7. "Search peer" is an alternate name for "indexer" and a search peer may be largely similar to the indexer described previously. The search peer 764 may be referred to as a "peer node" when the search peer 764 is part of an indexer cluster. The search peer 764, which may also be referred to as a search execution component, can be implemented using program code that can be executed on a computing device. In some implementations, one set of program code implements both the search head 762 and the search peer 764 such that the search head 762 and the search peer 764 form one component. In some implementations, the search head 762 is an independent piece of code that performs searching and no indexing functionality. In these implementations, the search head 762 may be referred to as a dedicated search head.

The search head 762 may consider multiple criteria when determining whether to send the query 766 to the particular search peer 764. For example, the search system 760 may be configured to include multiple search peers that each have duplicative copies of at least some of the event data. In this example, the sending the search query 766 to more than one search peer allows the search system 760 to distribute the search workload across different hardware resources. As another example, search system 760 may include different search peers for different purposes (e.g., one has an index storing a first type of data or from a first data source while a second has an index storing a second type of data or from a second data source). In this example, the search query 766 may specify which indexes to search, and the search head 762 will send the query 766 to the search peers that have those indexes.

To identify events 778 to send back to the search head 762, the search peer 764 performs a map process 770 to obtain event data 774 from the index 738 that is maintained by the search peer 764. During a first phase of the map process 770, the search peer 764 identifies buckets that have events that are described by the time indicator in the search query 766. As noted above, a bucket contains events whose timestamps fall within a particular range of time. For each bucket 744 whose events can be described by the time indicator, during a second phase of the map process 770, the search peer 764 performs a keyword search using search terms specified in the search query 766. The search terms can be one or more of keywords, phrases, fields, Boolean expressions, and/or comparison expressions that in combination describe events being searched for. When segmentation is enabled at index time, the search peer 764 performs the keyword search 772 on the bucket's index file 746. As noted previously, the index file 746 includes a lexicon of the searchable terms in the events stored in the bucket's raw data 748 file. The keyword search 772 searches the lexicon for searchable terms that correspond to one or more of the search terms in the query 766. As also noted above, the lexicon incudes, for each searchable term, a reference to each location in the raw data 748 file where the searchable term can be found. Thus, when the keyword search identifies a searchable term in the index file 746 that matches query 766, the search peer 764 can use the location references to extract from the raw data 748 file the event data 774 for each event that include the searchable term.

In cases where segmentation was disabled at index time, the search peer 764 performs the keyword search 772 directly on the raw data 748 file. To search the raw data 748, the search peer 764 may identify searchable segments in events in a similar manner as when the data was indexed. Thus, depending on how the search peer 764 is configured, the search peer 764 may look at event fields and/or parts of event fields to determine whether an event matches the query 766. Any matching events can be added to the event data 774 read from the raw data 748 file. The search peer 764 can further be configured to enable segmentation at search time, so that searching of the index 738 causes the search peer 764 to build a lexicon in the index file 746.

The event data 774 obtained from the raw data 748 file includes the full text of each event found by the keyword search 772. During a third phase of the map process 770, the search peer 764 performs event processing 776 on the event data 774, with the steps performed being determined by the configuration of the search peer 764 and/or commands in the search query 766. For example, the search peer 764 can be configured to perform field discovery and field extraction. Field discovery is a process by which the search peer 764 identifies and extracts key-value pairs from the events in the event data 774. The search peer 764 can, for example, be configured to automatically extract the first 100 fields (or another number of fields) in the event data 774 that can be identified as key-value pairs. As another example, the search peer 764 can extract any fields explicitly mentioned in the search query 766. The search peer 764 can, alternatively or additionally, be configured with particular field extractions to perform.

Other examples of steps that can be performed during event processing 776 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 764 sends processed events 778 to the search head 762, which performs a reduce process 780. The reduce process 780 potentially receives events from multiple search peers and performs various results processing 782 steps on the events. The results processing 782 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 782 can further include applying commands from the search query 766 to the events. The query 766 can include, for example, commands for evaluating and/or manipulating fields (e.g., to generate new fields from existing fields or parse fields that have more than one value). As another example, the query 766 can include commands for calculating statistics over the events, such as counts of the occurrences of fields, or sums, averages, ranges, and so on, of field values. As another example, the query 766 can include commands for generating statistical values for purposes of generating charts of graphs of the events.

Through results processing 782, the reduce process 780 produces the events found by processing the search query 766, as well as some information about the events, which the search head 762 outputs to the search and reporting app 716 as search results 768. The search and reporting app 716 can generate visual interfaces for viewing the search results 768. The search and reporting app 716 can, for example, output visual interfaces for the network access application 706 running on a computing device 704 to generate.

The visual interfaces can include various visualizations of the search results 768, such as tables, line or area charts, Choropleth maps, or single values. The search and reporting app 716 can organize the visualizations into a dashboard, where the dashboard includes a panel for each visualization. A dashboard can thus include, for example, a panel listing the raw event data for the events in the search results 768, a panel listing fields extracted at index time and/or found through field discovery along with statistics for those fields, and/or a timeline chart indicating how many events occurred at specific points in time (as indicated by the timestamps associated with each event). In various implementations, the search and reporting app 716 can provide one or more default dashboards. Alternatively or additionally, the search and reporting app 716 can include functionality that enables a user to configure custom dashboards.

The search and reporting app 716 can also enable further investigation into the events in the search results 768. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 766. As another example, an interactive element can launch a different dashboard whose panels include more detailed information about the data that is displayed by the Interactive element. Other examples of actions that can be performed by interactive elements in a dashboard include opening a link, playing an audio or video file, or launching another application, among other examples.

Figure 8:
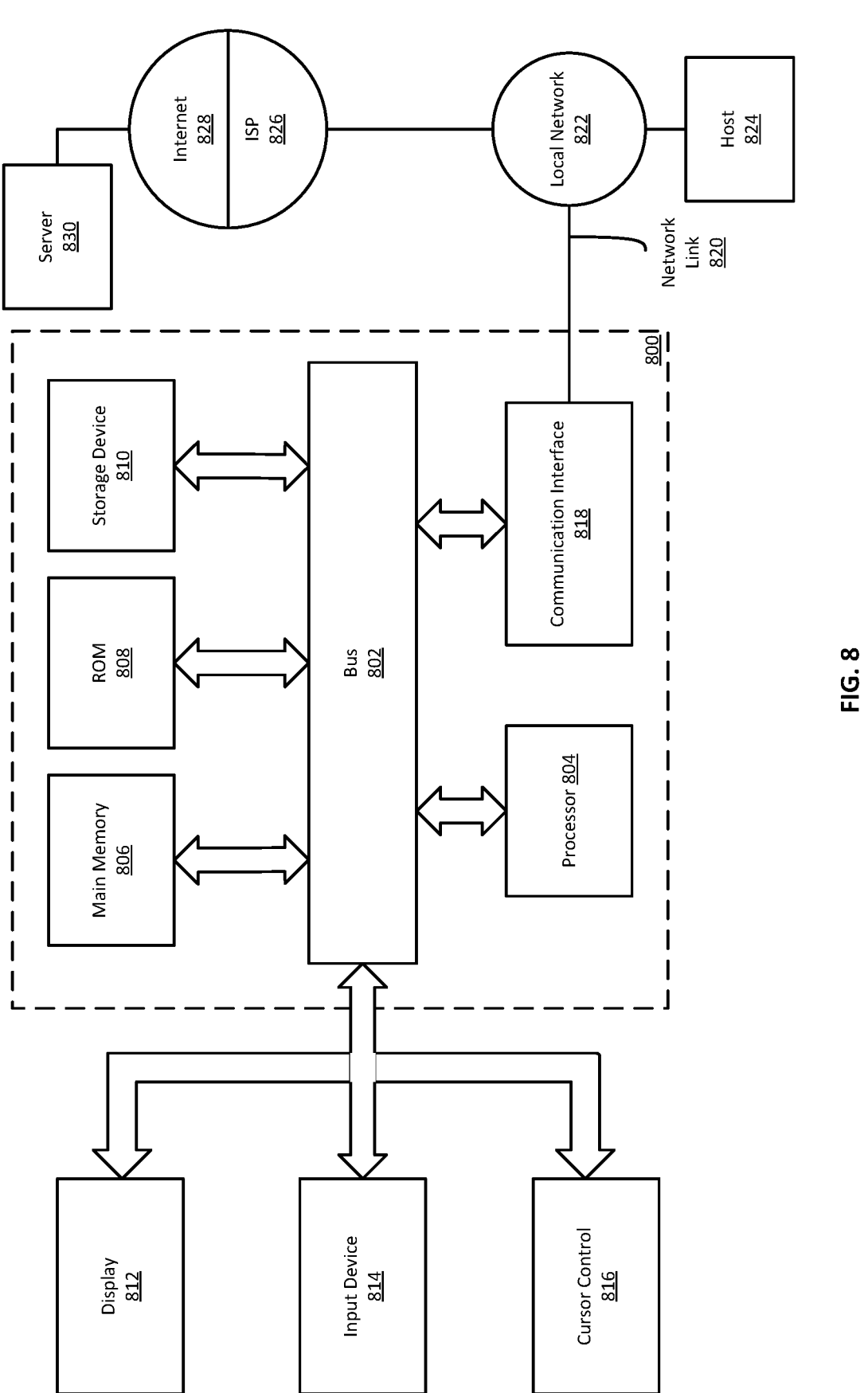
FIG. 8 is a block diagram illustrating an example computer system that may be used in some embodiments.

FIG. 8 is a block diagram that illustrates a computer system 800 utilized in implementing the above-described techniques, according to an example. Computer system 800 may be, for example, a desktop computing device, laptop computing device, tablet, smartphone, server appliance, computing mainframe, multimedia device, handheld device, networking apparatus, or any other suitable device.

Computer system 800 includes one or more buses 802 or other communication mechanism for communicating information, and one or more hardware processors 804 coupled with buses 802 for processing information. Hardware processors 804 may be, for example, general purpose microprocessors. Buses 802 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 800 also includes a main memory 806, such as a random access memory (RAM) or other dynamic or volatile storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 a special-purpose machine that is customized to perform the operations specified in the instructions.

Computer system 800 further includes one or more read only memories (ROM) 808 or other static storage devices coupled to bus 802 for storing static information and instructions for processor 804. One or more storage devices 810, such as a solid-state drive (SSD), magnetic disk, optical disk, or other suitable non-volatile storage device, is provided and coupled to bus 802 for storing information and instructions.

Computer system 800 may be coupled via bus 802 to one or more displays 812 for presenting information to a computer user. For instance, computer system 800 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 812 may include, without limitation, plasma display devices, projectors, cathode ray tube (CRT) monitors, electronic paper, virtual reality headsets, braille terminal, and/or any other suitable device for outputting information to a computer user. In an example, any suitable type of output device, such as, for instance, an audio speaker or printer, may be utilized instead of a display 812.

One or more input devices 814 are coupled to bus 802 for communicating information and command selections to processor 804. One example of an input device 814 is a keyboard, including alphanumeric and other keys. Another type of user input device 814 is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Yet other examples of suitable input devices 814 include a touch-screen panel affixed to a display 812, cameras, microphones, accelerometers, motion detectors, and/or other sensors. In an example, a network-based input device 814 may be utilized. In such an example, user input and/or other information or commands may be relayed via routers and/or switches on a Local Area Network (LAN) or other suitable shared network, or via a peer-to-peer network, from the input device 814 to a network link 820 on the computer system 800.

A computer system 800 may implement techniques described herein using customized hard-wired logic, one or more ASICs or FPGAs, firmware and/or program logic which in combination with the computer system causes or programs computer system 800 to be a special-purpose machine. According to one example, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In other examples, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 800 can receive the data on the network and demodulate the signal to decode the transmitted instructions. Appropriate circuitry can then place the data on bus 802. Bus 802 carries the data to main memory 806, from which processor 804 retrieves and executes the instructions. The instructions received by main memory 806 may optionally be stored on storage device 810 either before or after execution by processor 804.

A computer system 800 may also include, in an example, one or more communication interfaces 818 coupled to bus 802. A communication interface 818 provides a data communication coupling, typically two-way, to a network link 820 that is connected to a local network 822. For example, a communication interface 818 may be an integrated services digital network (ISDN) card, cable modem, satellite modem, or a modem to provide a data communication connection to a corresponding type of telephone line. As another example, the one or more communication interfaces 818 may include a local area network (LAN) card to provide a data communication connection to a compatible LAN. As yet another example, the one or more communication interfaces 818 may include a wireless network interface controller, such as a 802.11-based controller, Bluetooth controller, Long Term Evolution (LTE) modem, and/or other types of wireless interfaces. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by a Service Provider 826. Service Provider 826, which may for example be an Internet Service Provider (ISP), in turn provides data communication services through a wide area network, such as the world-wide packet data communication network now commonly referred to as the "internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

In an example, computer system 800 can send messages and receive data, including program code and/or other types of instructions, through the network(s), network link 820, and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. As another example, information received via a network link 820 may be interpreted and/or processed by a software component of the computer system 800, such as a web browser, application, or server, which in turn issues instructions based thereon to a processor 804, possibly via an operating system and/or other intermediate layers of software components.

In some examples, some or all of the systems described herein may be or comprise server computer systems, including one or more computer systems 800 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/ steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:
   identifying, by a security intelligence management service running in a cloud provider network, a data source external to the cloud provider network and from which data is to be obtained by the security intelligence management service, wherein the data relates to a potential incident identified by a data intake and query system that interfaces with the security intelligence management service based on a correlation search executed by the data intake and query system, and wherein the potential incident affects the security or operation of a computing environment;

sending, a first message to a first message queue provisioned by the security intelligence management service using a message queuing service of the cloud provider network to cause execution of a first function using an on-demand code execution service of the cloud provider network, wherein the first function obtains the data from the data source and wherein execution of the first function is triggered responsive to the on-demand execution service detecting the first message in the first message queue;

sending, by the first function, a second message to a second message queue provisioned by the security intelligence management service using the message queueing service to cause execution of a second function using the on-demand code execution service, wherein the second function performs at least one operation on the data obtained from the data source to obtain processed data and wherein execution of the second function is triggered responsive to the on-demand code execution service detecting the second message in the second message queue, and wherein the second message comprises an identifier of the first function and an identifier of the data source from which the data is to be obtained; and providing, by the security intelligence management service, the processed data to the data intake and query system that interfaces with the security intelligence management service.

2. The method of claim 1, wherein the data source is a first data source of a plurality of data sources external to the cloud provider network and from which the security intelligence management service obtains data, wherein the data is first data, and wherein the method further comprises:

identifying, by the security intelligence management service, a second data source of the plurality of data sources from which second data is to be obtained by the security intelligence management service;

causing execution of a third function using the on-demand code execution service of the cloud provider network, wherein the third function obtains the second data from the second data source; and causing execution of a fourth function using the on-demand code execution service, wherein the fourth function performs at least one operation on the second data obtained from the second data source.

3. The method of claim 1, further comprising determining, by a scheduler of the security intelligence management service, a time at which to initiate obtaining the data from the data source, wherein the time at which to initiate obtaining the data is determined based on configuration data associated with the data source.

4. The method of claim 1, wherein the second function sends an update message to a message queue indicating that the processed data is available for subsequent processing.

5. The method of claim 1, wherein the first function stores the data obtained from the data source in a logical storage container provided by a storage service of the cloud provider network, and wherein the second function obtains the data from the logical storage container.

6. The method of claim 1, wherein the on-demand code execution service executes user-provided code responsive to defined events, and wherein the on-demand code execution service automatically manages computing resources used to execute the user-provided code.

7. The method of claim 1, further comprising assigning, by the second function, a risk score to a data object relevant to the data obtained from the data source.

8. The method of claim 1, wherein the first function queries the data source using at least one query parameter provided to the first function by the security intelligence management service.

9. The method of claim 1, wherein the security intelligence management service configures the first function to be allocated a specified amount of computing resources during execution by the on-demand code execution service.

10. The method of claim 1, wherein the security intelligence management service configures the first function to be allocated a first amount of computing resources during execution by the on-demand code execution service, wherein the security intelligence management service configures the second function to be allocated a second amount of computing resources during execution, and wherein the first amount of computing resources differs from the second amount of computing resources.

11. The method of claim 1, further comprising:

determining, based on historical data reflecting past executions of the first function, an amount of computing resources to allocate to the first function during execution by the on-demand code execution service; and configuring the on-demand code execution service to allocate the amount of computing resources to invocations of the first function.

12. A computing device, comprising:

a processor; and a non-transitory computer-readable medium having stored thereon instructions that, when executed by the processor, cause the processor to perform operations including:

identifying, by a security intelligence management service running in a cloud provider network, a data source external to the cloud provider network and from which data is to be obtained by the security intelligence management service, wherein the data relates to a potential incident identified by a data intake and query system that interfaces with the security intelligence management service based on a correlation search executed by the data intake and query system, and wherein the potential incident affects the security or operation of a computing environment;

sending a first message to a first message queue provisioned by the security intelligence management service using a message queuing service of the cloud provider network to cause execution of a first function using an on-demand code execution service of the cloud provider network, wherein the first function obtains the data from the data source and wherein execution of the first function is triggered responsive to the on-demand execution service detecting the first message in the first message queue;

sending, by the first function, a second message to a second message queue provisioned by the security intelligence management service using the message queueing service to cause execution of a second function using the on-demand code execution service, wherein the second function performs at least one operation on the data obtained from the data source to obtain processed data and wherein execution of the second function is triggered responsive to the on-demand code execution service detecting the second message in the second message queue, and wherein the second message comprises an identifier of the first function and an identifier of the data source from which the data is to be obtained; and providing, by the security intelligence management service, the processed data to the data intake and query system that interfaces with the security intelligence management service.

13. The computing device of claim 12, wherein the data source is a first data source of a plurality of data sources external to the cloud provider network and from which the security intelligence management service obtains data, wherein the data is first data, and wherein the instructions, when executed by the processor, further cause the processor to perform operations including:

identifying, by the security intelligence management service, a second data source of the plurality of data sources from which second data is to be obtained by the security intelligence management service;

causing execution of a third function using the on-demand code execution service of the cloud provider network, wherein the third function obtains the second data from the second data source; and causing execution of a fourth function using the on-demand code execution service, wherein the fourth function performs at least one operation on the second data obtained from the second data source.

14. The computing device of claim 12, wherein the instructions, when executed by the processor, further cause the processor to perform operations including determining, by a scheduler of the security intelligence management service, a time at which to initiate obtaining the data from the data source, wherein the time at which to initiate obtaining the data is determined based on configuration data associated with the data source.

15. A non-transitory computer-readable medium having stored thereon instructions that, when executed by one or more processors, cause the one or more processors to perform operations including:

identifying, by a security intelligence management service running in a cloud provider network, a data source external to the cloud provider network and from which data is to be obtained by the security intelligence management service, wherein the data relates to a potential incident identified by a data intake and query system that interfaces with the security intelligence management service based on a correlation search executed by the data intake and query system, and wherein the potential incident affects the security or operation of a computing environment;

sending, a first message to a first message queue provisioned by the security intelligence management service using a message queuing service of the cloud provider network to cause execution of a first function using an on-demand code execution service of the cloud provider network, wherein the first function obtains the data from the data source and wherein execution of the first function is triggered responsive to the on-demand execution service detecting the first message in the first message queue;

sending, by the first function, a second message to a second message queue provisioned by the security intelligence management service using the message queueing service to cause execution of a second function using the on-demand code execution service, wherein the second function performs at least one operation on the data obtained from the data source to obtain processed data and wherein execution of the second function is triggered responsive to the on-demand code execution service detecting the second message in the second message queue, and wherein the second message comprises an identifier of the first function and an identifier of the data source from which the data is to be obtained; and providing, by the security intelligence management service, the processed data to the data intake and query system that interfaces with the security intelligence management service.

16. The computer-readable medium of claim 15, wherein the data source is a first data source of a plurality of data sources external to the cloud provider network and from which the security intelligence management service obtains data, wherein the data is first data, and wherein the instructions, when executed by the processor, further cause the processor to perform operations including:

identifying, by the security intelligence management service, a second data source of the plurality of data sources from which second data is to be obtained by the security intelligence management service;

causing execution of a third function using the on-demand code execution service of the cloud provider network, wherein the third function obtains the second data from the second data source; and causing execution of a fourth function using the on-demand code execution service, wherein the fourth function performs at least one operation on the second data obtained from the second data source.

17. The computer-readable medium of claim 15, wherein the instructions, when executed by the processor, further cause the processor to perform operations including determining, by a scheduler of the security intelligence management service, a time at which to initiate obtaining the data from the data source, wherein the time at which to initiate obtaining the data is determined based on configuration data associated with the data source.

* * * * *